United States Patent
Moon et al.

(10) Patent No.: US 12,271,611 B2
(45) Date of Patent: Apr. 8, 2025

(54) METHOD OF OPERATING A STORAGE DEVICE INCLUDING DETECTING AN ABNORMAL AREA, WHERE AN ACCESS TIME EXCEEDS A REFERENCE LATENCY, AS AN OPTIONAL AREA IN THE NONVOLATILE MEMORY DEVICE AND STORING OPTIONAL DATA IN THE OPTIONAL AREA, AND A STORAGE DEVICE FOR PERFORMING THE METHOD

(71) Applicant: Samsung Electronics Co., Ltd., Suwon-si (KR)

(72) Inventors: Dongouk Moon, Seongnam-si (KR); Sanghwa Jin, Seongnam-si (KR); Jinwook Lee, Seoul (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 363 days.

(21) Appl. No.: 17/879,967

(22) Filed: Aug. 3, 2022

(65) Prior Publication Data
US 2023/0221875 A1 Jul. 13, 2023

(30) Foreign Application Priority Data
Jan. 7, 2022 (KR) .................. 10-2022-0002643

(51) Int. Cl.
*G06F 3/06* (2006.01)
(52) U.S. Cl.
CPC ............ *G06F 3/064* (2013.01); *G06F 3/0604* (2013.01); *G06F 3/0679* (2013.01)
(58) Field of Classification Search
CPC ...... G06F 3/0604; G06F 3/064; G06F 3/0679; G06F 11/07; G06F 2212/1032; G06F 2212/7204

USPC ........................................ 711/112
See application file for complete search history.

(56) References Cited

U.S. PATENT DOCUMENTS

| 7,679,133 | B2 | 3/2010 | Son et al. |
| 8,041,991 | B2 | 10/2011 | McKean |
| 8,370,680 | B2 | 2/2013 | Lee et al. |
| 8,553,466 | B2 | 10/2013 | Han et al. |

(Continued)

FOREIGN PATENT DOCUMENTS

| KR | 101090394 B1 | 12/2011 |
| KR | 101473837 B1 | 12/2014 |

OTHER PUBLICATIONS

Chin-Hsien Wu and Tei-Wei Kuo. 2006. An adaptive two-level management for the flash translation layer in embedded systems. In Proceedings of the 2006 IEEE/ACM international conference on Computer-aided design (ICCAD '06). Association for Computing Machinery, New York, NY, USA, 601-606. (Year: 2006).*

(Continued)

*Primary Examiner* — Reginald G Bragdon
*Assistant Examiner* — Aaron D Ho
(74) *Attorney, Agent, or Firm* — HARNESS, DICKEY & PIERCE, P.L.C.

(57) ABSTRACT

In a method of operating a storage device including a nonvolatile memory device, an abnormal area may be detected as an optional area in the nonvolatile memory device, and optional data optional data may be stored in the optional area. The abnormal area may be a portion of the nonvolatile memory device having an access time exceeding a reference latency.

19 Claims, 21 Drawing Sheets

(56) References Cited

U.S. PATENT DOCUMENTS

| | | | |
|---|---|---|---|
| 8,559,235 B2 | 10/2013 | Yoon et al. | |
| 8,654,587 B2 | 2/2014 | Yoon et al. | |
| 9,595,343 B1* | 3/2017 | Srinivasan | G11C 16/3459 |
| 10,545,684 B2 | 1/2020 | Koseki et al. | |
| 10,845,992 B2 | 11/2020 | Yano et al. | |
| 11,314,416 B1* | 4/2022 | Shveidel | G06F 3/064 |
| 2007/0234107 A1* | 10/2007 | Davison | G06F 11/1662 |
| | | | 714/E11.089 |
| 2010/0217949 A1* | 8/2010 | Schopp | G06F 9/5077 |
| | | | 711/E12.002 |
| 2011/0233648 A1 | 9/2011 | Seol et al. | |
| 2013/0151764 A1* | 6/2013 | Strope | G06F 12/0246 |
| | | | 711/103 |
| 2014/0351506 A1* | 11/2014 | Santry | G06F 3/067 |
| | | | 711/114 |
| 2015/0347243 A1* | 12/2015 | Guerin | G06F 15/17331 |
| | | | 709/212 |
| 2020/0233601 A1 | 7/2020 | Du et al. | |
| 2021/0011845 A1* | 1/2021 | Huang | G06F 12/0246 |
| 2021/0081127 A1* | 3/2021 | Xiao | G06F 3/0614 |
| 2021/0191647 A1 | 6/2021 | Muthiah | |
| 2021/0223958 A1* | 7/2021 | Yu | G06F 12/0246 |
| 2022/0057936 A1* | 2/2022 | Li | G06F 3/0659 |
| 2022/0221997 A1* | 7/2022 | Navon | G06F 3/0673 |
| 2022/0236901 A1* | 7/2022 | Rao | G06F 3/0611 |
| 2022/0342753 A1* | 10/2022 | Liu | G06F 11/076 |
| 2023/0205690 A1* | 6/2023 | Yeung | G11C 5/148 |
| | | | 711/154 |

OTHER PUBLICATIONS

P. Huang, G. Wu, X. He, and W. Xiao. An aggressive worn-out flash block management scheme to alleviate SSD performance degradation. In Proceedings of the Ninth European Conference on Computer Systems (EuroSys '14). Association for Computing Machinery, New York, NY, USA, Article 22, 1-14. (Year: 2014).*

Y. Oh, E. Lee, C. Hyun, J. Choi, D. Lee, and S.H. Noh. 2015. Enabling Cost-Effective Flash based Caching with an Array of Commodity SSDs. In Proceedings of the 16th Annual Middleware Conference (Middleware '15). Association for Computing Machinery, New York, NY, USA, 63-74. (Year: 2015).*

Borge, María F., Florin Dinu, and Willy Zwaenepoel. "Understanding and taming SSD read performance variability: HDFS case study." arXiv preprint arXiv:1903.09347 (2019). (Year: 2019).*

S. J. Kwon, "Address Translation Layer for Byte-Addressable Non-Volatile Memory-Based Solid State Drives," in IEEE Access, vol. 7, pp. 73207-73214, 2019, doi: 10.1109/ACCESS.2019. 2920249 (Year: 2019).*

* cited by examiner

| UNIQUE KEY | VERSION | ADDRESS | STORE COUNT | POLICY | UPDATED TIME |
|---|---|---|---|---|---|
| KEY1 (SNAPSHOT_KEY) | VER1 | 0x1000 | 3 | OLDEST | 1638855850 |
| | VER2 | 0x2000 | | | 1638855851 |
| | VER3 | 0x3000 | | | 1638855852 |
| ... | ... | ... | ... | ... | ... |
| KEY2 | VER | 0x4000 | 1 | LARGEST | 1638855857 |

| UNIQUE KEY | VERSION | PHYSICAL ADDRESS | UPDATED TIME |
|---|---|---|---|
| KEY1 (SNAPSHOT_KEY) | 1 | 0x1001 | 1638855848 |
| | 2 | 0x2001 | 1638855849 |
| ... | ... | ... | ... |
| KEY2 | 1 | 0x4001 | 1638855856 |

METHOD OF OPERATING A STORAGE DEVICE INCLUDING DETECTING AN ABNORMAL AREA, WHERE AN ACCESS TIME EXCEEDS A REFERENCE LATENCY, AS AN OPTIONAL AREA IN THE NONVOLATILE MEMORY DEVICE AND STORING OPTIONAL DATA IN THE OPTIONAL AREA, AND A STORAGE DEVICE FOR PERFORMING THE METHOD

CROSS-REFERENCE TO RELATED APPLICATION

This application claims priority under 35 USC § 119 to Korean Patent Application No. 10-2022-0002643, filed on Jan. 7, 2022 in the Korean Intellectual Property Office (KIPO), the contents of which are herein incorporated by reference in their entirety.

BACKGROUND

1. Technical Field

Example embodiments relate generally to semiconductor integrated circuits, and more particularly to a method of operating a storage device, and the storage device.

2. Description of the Related Art

A storage device may include a nonvolatile memory device that stores data, and a storage controller that controls the nonvolatile memory device. The storage controller may write data provided from a host to the nonvolatile memory device in response to a write request, and may read data from the nonvolatile memory device to provide the data to the host in response to a read request.

In a case where an access time for an area of the nonvolatile memory device exceeds a reference latency, to ensure access (e.g., write and/or read) performance for the storage device, the area of the nonvolatile memory device may be determined as an abnormal area, and may not be used as a storage space.

SUMMARY

At least one example embodiment of the present disclosure provides a method of operating a storage device capable of using an abnormal area as a storage space.

At least one example embodiment of the present disclosure provides a storage device capable of using an abnormal area as a storage space.

According to example embodiments, in a method of operating a storage device including a nonvolatile memory device, an abnormal area may be detected as an optional area in the nonvolatile memory device, and optional data may be stored in the optional area. The abnormal area may be a portion of the nonvolatile memory device where an access time exceeds a reference latency.

According to example embodiments, a storage device may include a nonvolatile memory device, and a storage controller configured to control the nonvolatile memory device. The storage controller may be configured to detect an abnormal area as an optional area in the nonvolatile memory device and to store optional data in the optional area. The abnormal area may be a portion of the nonvolatile memory device where an access time exceeds a reference latency.

According to example embodiments, a method of operating a storage device including a nonvolatile memory device is provided. The method may include detecting an abnormal area as an optional area in the nonvolatile memory device, the abnormal area being a portion of the nonvolatile memory device where an access time exceeds a reference latency; receiving a write request including a logical address for a memory block within a normal area of the nonvolatile memory device, write data, and first meta data, the first meta data including a first unique key, a first version value, a store count and policy information for the write data; writing the write data to the memory block based on a physical address to which the logical address is mapped; updating an optional data management table based on the first meta data; comparing a number of data having the first unique key and different version values in the optional data management table with the store count of the first meta data; selecting one of the data having the different version values based on the policy information of the first meta data if the number of data is greater than the store count; reading the one of the data from the normal area; writing the one of the data as optional data to the optional area; and storing the first unique key, a version value of the one of the data among the different version values, and a physical address of the one of the data within the optional area in an optional area table.

In a method of operating a storage device and the storage device according to example embodiments, an abnormal area of which an access time exceeds a reference latency may be detected as an optional area in a nonvolatile memory device, and optional data may be stored in the optional area. Accordingly, since an area that is not used in a conventional storage device is used as a storage space for the optional data, a storage space of the storage device may be expanded, and the storage device may be efficiently used.

BRIEF DESCRIPTION OF THE DRAWINGS

Illustrative, non-limiting example embodiments will be more clearly understood from the following detailed description taken in conjunction with the accompanying drawings.

FIG. 14 is a diagram illustrating another example of an optional area table.

DETAILED DESCRIPTION OF EXAMPLE EMBODIMENTS

Figure 1:
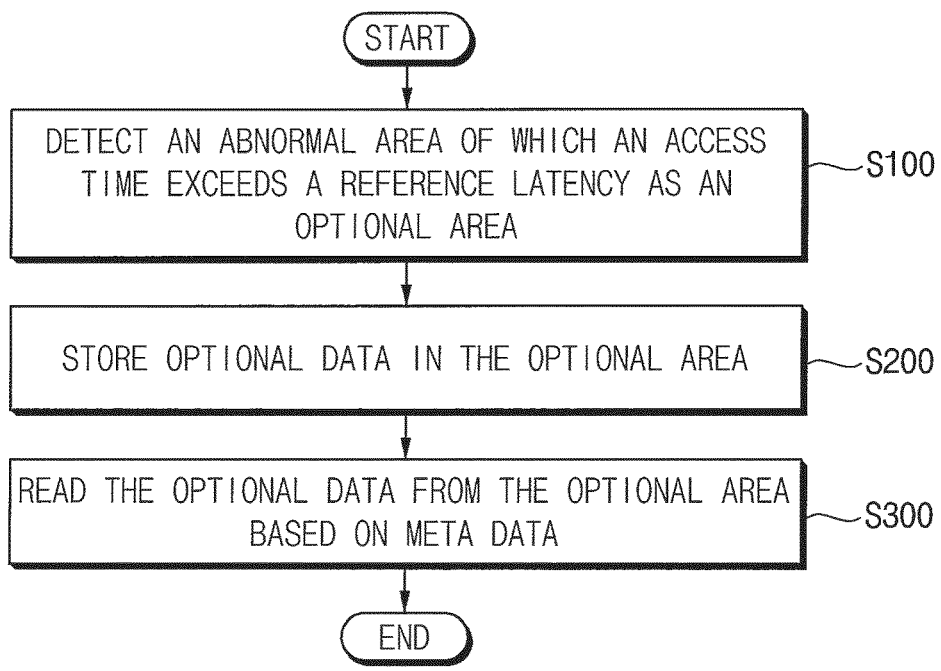
FIG. 1 is a flowchart illustrating a method of operating a storage device according to example embodiments.

Various example embodiments will be described more fully with reference to the accompanying drawings, in which example embodiments are shown. The present disclosure may, however, be embodied in many different forms and should not be construed as limited to the example embodiments set forth herein. Like reference numerals refer to like elements throughout this application.

FIG. 1 is a flowchart illustrating a method of operating a storage device according to example embodiments.

Referring to FIG. 1, in a method of operating a storage device according to example embodiments, an abnormal area of which an access time exceeds a reference latency may be detected as an optional area in a nonvolatile memory device of the storage device (operation S100). The abnormal area detected as the optional area may be a region (or an area) that requires the access time longer than the reference latency, but may be an accessible region. In some example embodiments, the reference latency may include a reference write latency. In a case where (e.g., in response to a condition where) a time of a write operation for a memory block of the nonvolatile memory device exceeds the reference write latency, the memory block may be detected as the optional area. In other example embodiments, the reference latency may further include a reference read latency. In a case where a time of a read operation for a memory block exceeds the reference read latency, the memory block may be detected as the optional area. In the present disclosure, the optional area also may be referred to as a secondary area and the optional data also may be referred to as secondary data.

Optional data may be stored in the optional area (operation S200). Thus, the optional area may be used as a storage space for storing the optional data. In some example embodiments, the optional data may be any data stored in the optional area. In other example embodiments, the optional data may be data that do not matter even if input/output or access (e.g., write and/or read) of the data takes a long time (longer than the reference latency). For example, the optional data may be, but not be limited to, snapshot data, proof of space data, etc. In still other example embodiments, the optional data may be data moved from a normal area of the nonvolatile memory device to the optional area, data deleted from the normal area, or backup data of data stored in the normal area.

Unlike the normal area that has a physical address to which a logical address is mapped and that is accessible by a host based on the logical address, a physical address of the optional area may not be mapped to a logical address, and an address of the optional area may not be provided to the host. Thus, a read request for the optional area may not include a logical address, but may include meta data representing which optional data are requested. In response to the read request including the meta data, the storage device may read the optional data from the optional area based on the meta data (operation S300).

In a conventional storage device, in a case where an access time for an area of a nonvolatile memory device exceeds the reference latency, to ensure access (e.g., write and/or read) performance for the conventional storage device, the area of the nonvolatile memory device may be determined as an abnormal area, and may not be used as a storage space. However, in the method of operating the storage device according to example embodiments, the abnormal area of which the access time exceeds the reference latency may be detected as the optional area, and the optional data may be stored in the optional area. Accordingly, an area that is not used in the conventional storage device may be used as a storage space for the optional data, a storage space of the storage device may be expanded, and the storage device may be efficiently used.

Figure 2:
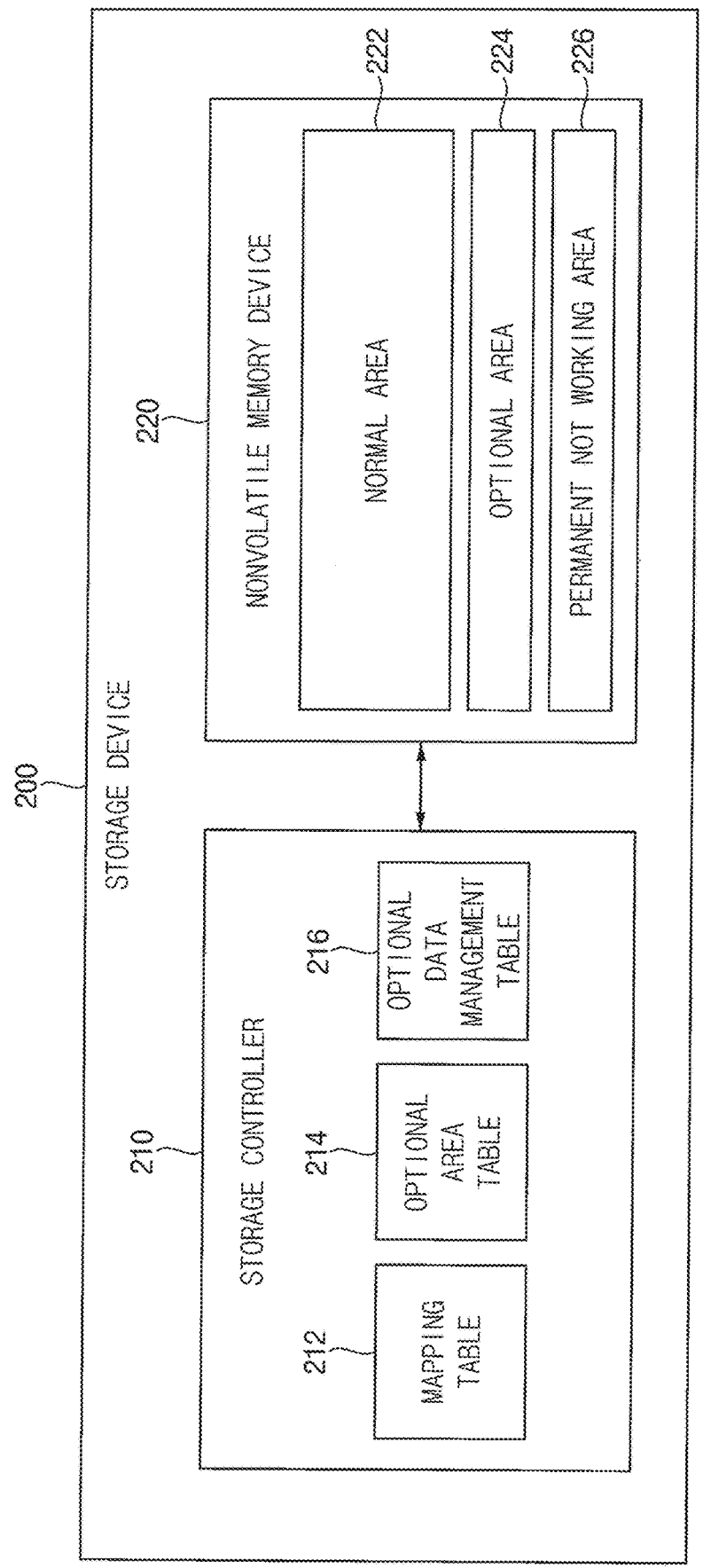
FIG. 2 is a block diagram illustrating a storage device according to example embodiments.
Figure 3:
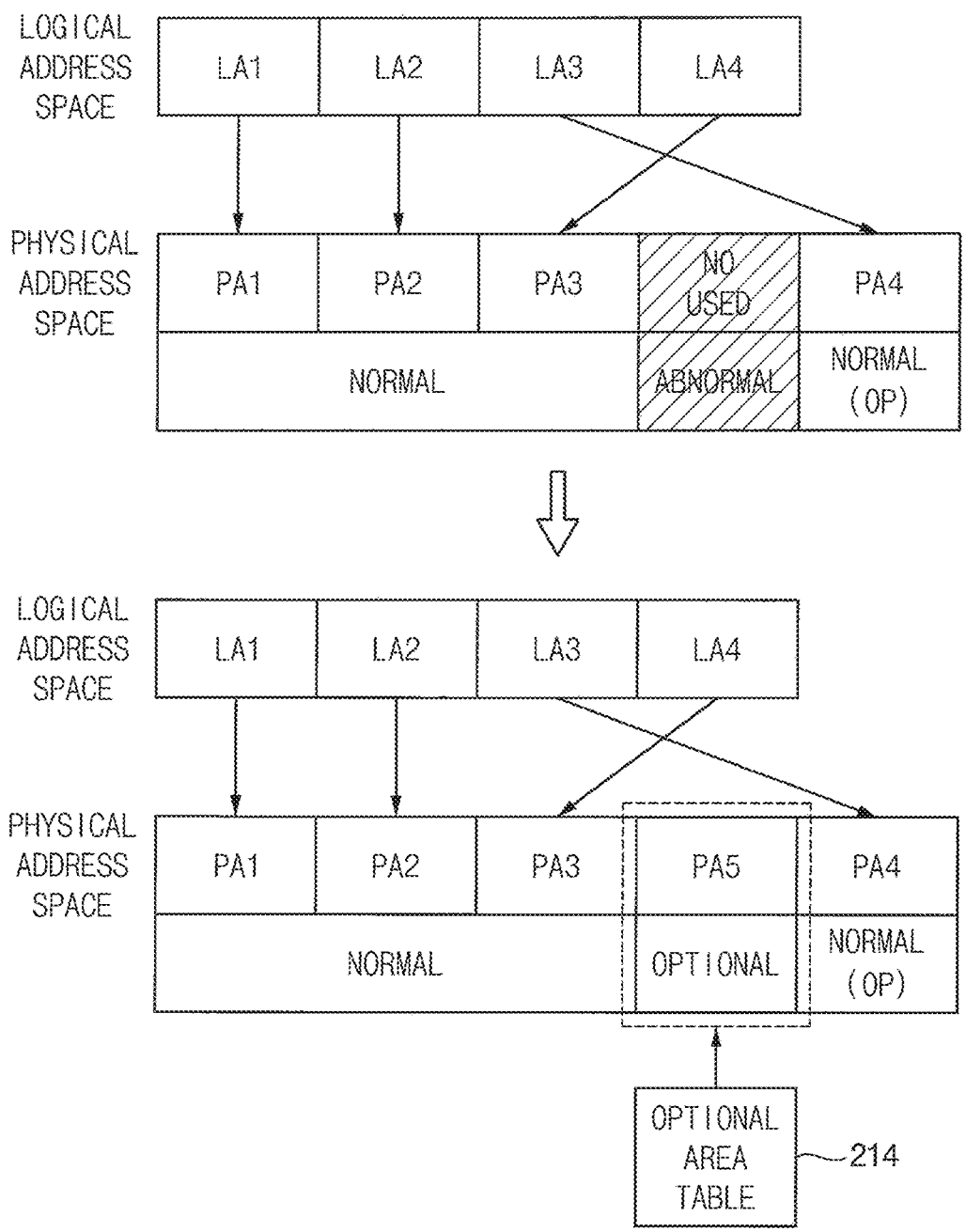
FIG. 3 is a diagram for describing an example of a logical address space and a physical address space in a storage device according to example embodiments.
Figure 4:
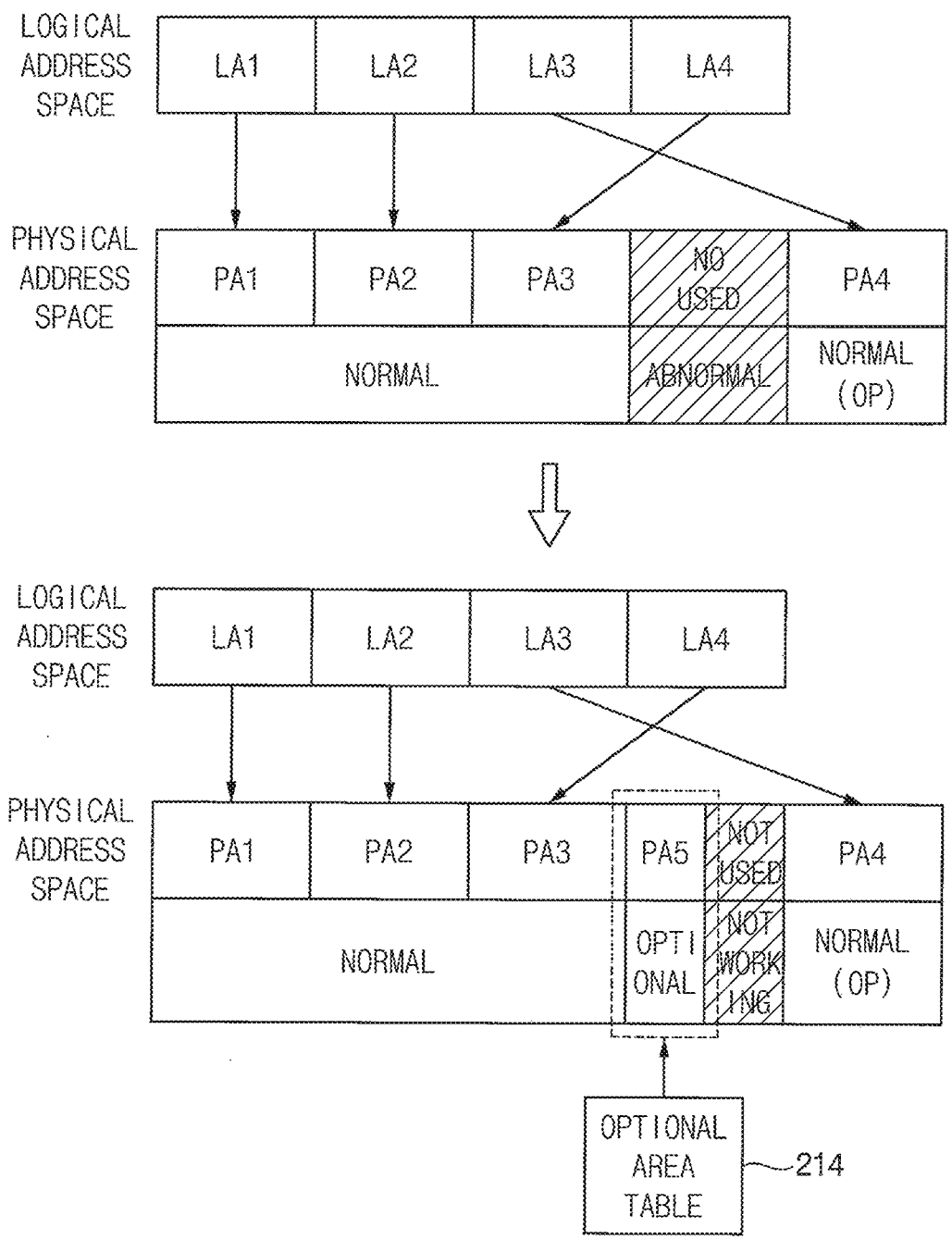
FIG. 4 is a diagram for describing another example of a logical address space and a physical address space in a storage device according to example embodiments.

FIG. 2 is a block diagram illustrating a storage device according to example embodiments, FIG. 3 is a diagram for describing an example of a logical address space and a physical address space in a storage device according to example embodiments, and FIG. 4 is a diagram for describing another example of a logical address space and a physical address space in a storage device according to example embodiments.

Referring to FIG. 2, a storage device 200 according to example embodiments may include a nonvolatile memory device 220 that stores data, and a storage controller 210 that controls the nonvolatile memory device 220. In some example embodiments, the storage device 200 may be a solid state drive (SSD) device. For example, the storage device 200 may be an SSD device that conforms to an NVMe standard. In other example embodiments, the storage device 200 may be universal flash storage (UFS) device, a multi-media card (MMC) device or an embedded MMC (eMMC) device. In still other example embodiments, the storage device 200 may be a secure digital (SD) card, a micro SD card, a memory stick, a chip card, a universal serial bus (USB) card, a smart card, a compact flash (CF) card, or the like.

The nonvolatile memory device 220 may be controlled by the storage controller 210 to store write data received from a host. Data stored in the nonvolatile memory device 220 may be read by the storage controller 210, and may be provided as read data to the host. In some example embodiments, the nonvolatile memory device 220 may be implemented with, but not limited to, a NAND flash memory. In other example embodiments, the nonvolatile memory device 220 may be implemented with an electrically erasable programmable read-only memory (EEPROM), a phase change random access memory (PRAM), a resistive random access memory (RRAM), a nano floating gate memory (NFGM), a polymer random access memory (PoRAM), a magnetic random access memory (MRAM), a ferroelectric random access memory (FRAM), or the like.

The storage controller 210 may control an overall operation of the storage device 200. For example, the storage controller 210 may perform a write operation that writes the write data to the nonvolatile memory device 220, or may perform a read operation that reads the read data from the nonvolatile memory device 220. The storage controller 210 may include a mapping table 212 that maps a logical address provided to the host to a physical address of the nonvolatile memory device 220, and may perform the write operation and the read operation by using the mapping table 212. For example, in response to a write request having a first logical address from the host, the storage controller 210 may perform the write operation for a first memory block of the nonvolatile memory device 220 having a first physical address to which the first logical address is mapped. Further, in response to a read request having a second logical address from the host, the storage controller 210 may perform the read operation for a second memory block of the nonvolatile memory device 220 having a second physical address to which the second logical address is mapped.

The storage controller 210 may detect an abnormal area of which an access time exceeds a reference latency as an optional area 224 in the nonvolatile memory device 220. For example, as described below with reference to FIGS. 5 and 6, the storage controller 210 may receive a write request for a memory block within a normal area 222 of the nonvolatile memory device 220 from the host, and may perform the write operation for the memory block. If the write operation is not completed within a reference write latency, the storage controller 210 may transfer a write fail response to the host, and may set the memory block previously in the normal area 222 as the optional area 224. In another example, as described below with reference to FIGS. 7 and 8, the storage controller 210 may receive a read request for a memory block within the normal area 222 of the nonvolatile memory device 220 from the host, and may perform the read operation for the memory block. If the read operation is not completed within a reference read latency, the storage controller 210 may transfer a read fail response to the host, and may set the memory block previously in the normal area 222 as the optional area 224.

The mapping table 212 may map the logical address to a physical address of the normal area 222, but may not map the logical address to a physical address of the optional area 224. Thus, the physical address of the optional area 224 may not be mapped to the logical address, and an address of the optional area 224 may not be provided to the host. To manage the physical address of the optional area 224, the storage controller 210 may further include an optional area table 214 for managing optional data stored in the optional area 224. In some example embodiments, as described below with reference to FIG. 10, the optional area table 214 may include a unique key for the optional data, and a physical address of the optional area 224 in which the optional data are stored. In other example embodiments, as described below with reference to FIG. 14, the optional area table 214 may further include a version value for the optional data, and an update time at which the optional data are stored. After writing the optional data to the optional area 224, the storage controller 210 may update information for the optional data in the optional area table 214. Further, the storage controller 210 may read the optional data from the optional area 224 based on the information stored in the optional area table 214.

In some example embodiments, the optional data may be data moved from the normal area 222 to the optional area 224. The storage controller 210 may further include an optional data management table 216 that manages the optional data stored in the normal area 222 (before the optional data is moved to the optional area 224), and that is used in determining the optional data to be moved to the optional area 224. In some example embodiments, as described below with reference to FIG. 13, the optional data management table 216 may include, but not limited to, a unique key, a version value, an address, a store count, policy information and an update time for the optional data.

In the storage device 200 according to example embodiments, the storage controller 210 may use the optional area 224 as a storage space for storing the optional data by using the optional area table 214 and/or the optional data management table 216. For example, as illustrated in FIG. 3, logical addresses LA1, LA2, LA3 and LA4 in a logical address space provided to the host may be mapped to physical addresses PA1, PA2, PA3 and PA4 of the normal area NORMAL of the nonvolatile memory device 220 in a physical address space by using the mapping table 212. In some example embodiments, the normal area NORMAL may include an over-provisioning region OP.

In a conventional storage device, in a case where an access time for an area of a nonvolatile memory device exceeds the reference latency, the area of the nonvolatile memory device may be determined as an abnormal area ABNORMAL, a physical address of the abnormal area ABNORMAL may not be mapped to logical addresses LA1, LA2, LA3 and LA4, and the abnormal area ABNORMAL may not be used (e.g., "NOT USED"). However, in the storage device 200 according to example embodiments, the abnormal area ABNORMAL of which the access time exceeds the reference latency may be set as the optional area OPTIONAL or 224, and the optional area OPTIONAL or 224 may be used to store the optional data. A physical address PA5 of the optional area OPTIONAL or 224 may not be mapped to the logical addresses LA1, LA2, LA3 and LA4, and may be managed by using the optional area table 214. Here, the optional area OPTIONAL or 224 may be a region (or an area) that requires the access time longer than the reference latency, but may be an accessible region.

In some example embodiments, as illustrated in FIG. 4, the abnormal area ABNORMAL that is an inaccessible region (or an inaccessible area) or the abnormal area ABNORMAL of which the access time exceeds a bad block reference latency longer than the reference latency may be set as a permanent not working area NOT WORKING or 226, and the permanent not working area NOT WORKING or 226 may not be used (e.g., "NOT USED").

As described above, in the storage device 200 according to example embodiments, the abnormal area ABNORMAL may be set as the optional area OPTIONAL or 224, and the optional area OPTIONAL or 224 may be used to store the optional data. Accordingly, a storage space of the storage device 200 may be expanded, and the storage device 200 may be efficiently used.

Figure 5:
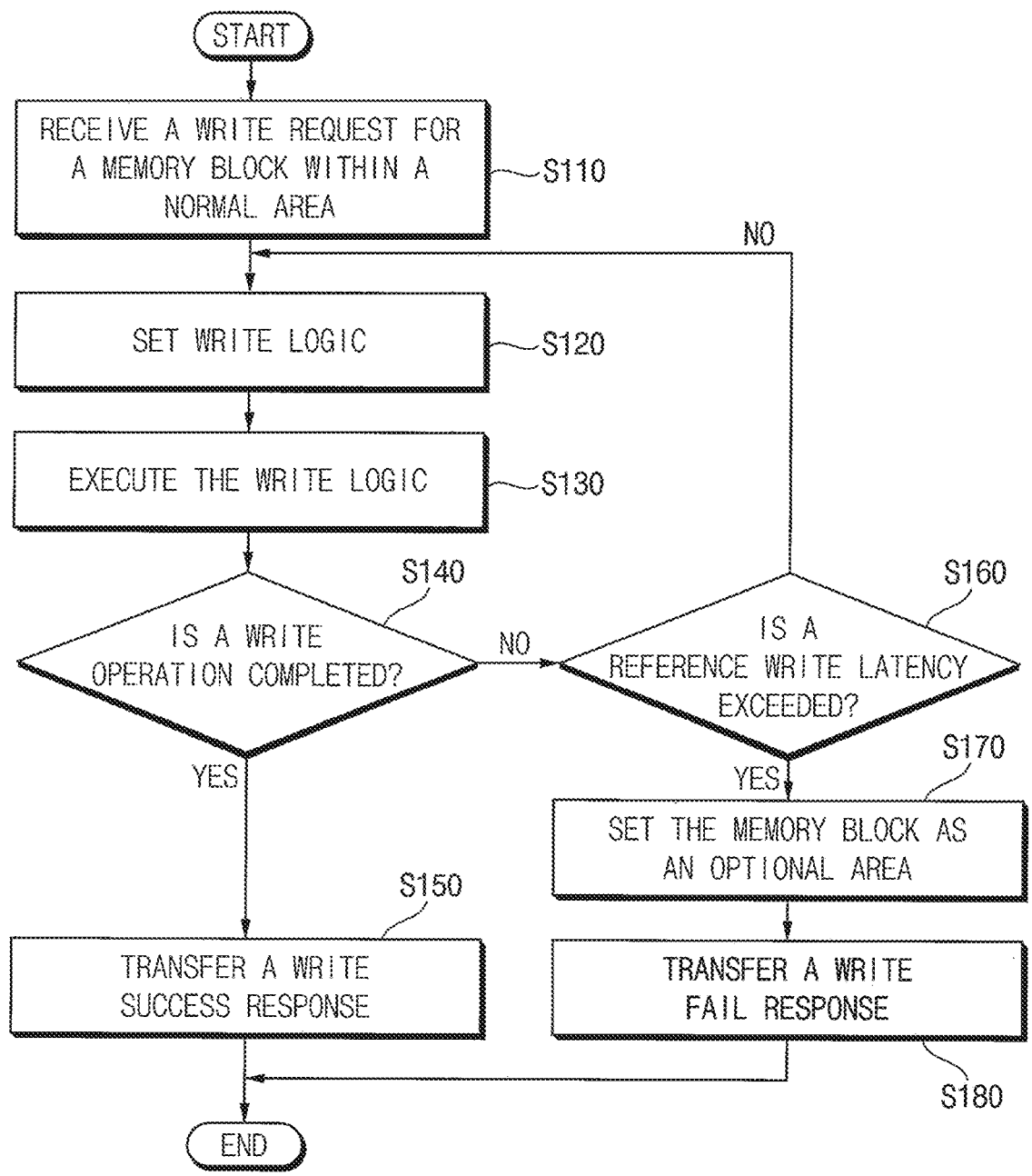
FIG. 5 is a flowchart for describing an example where an optional area is detected in a method of operating a storage device according to example embodiments.
Figure 6:
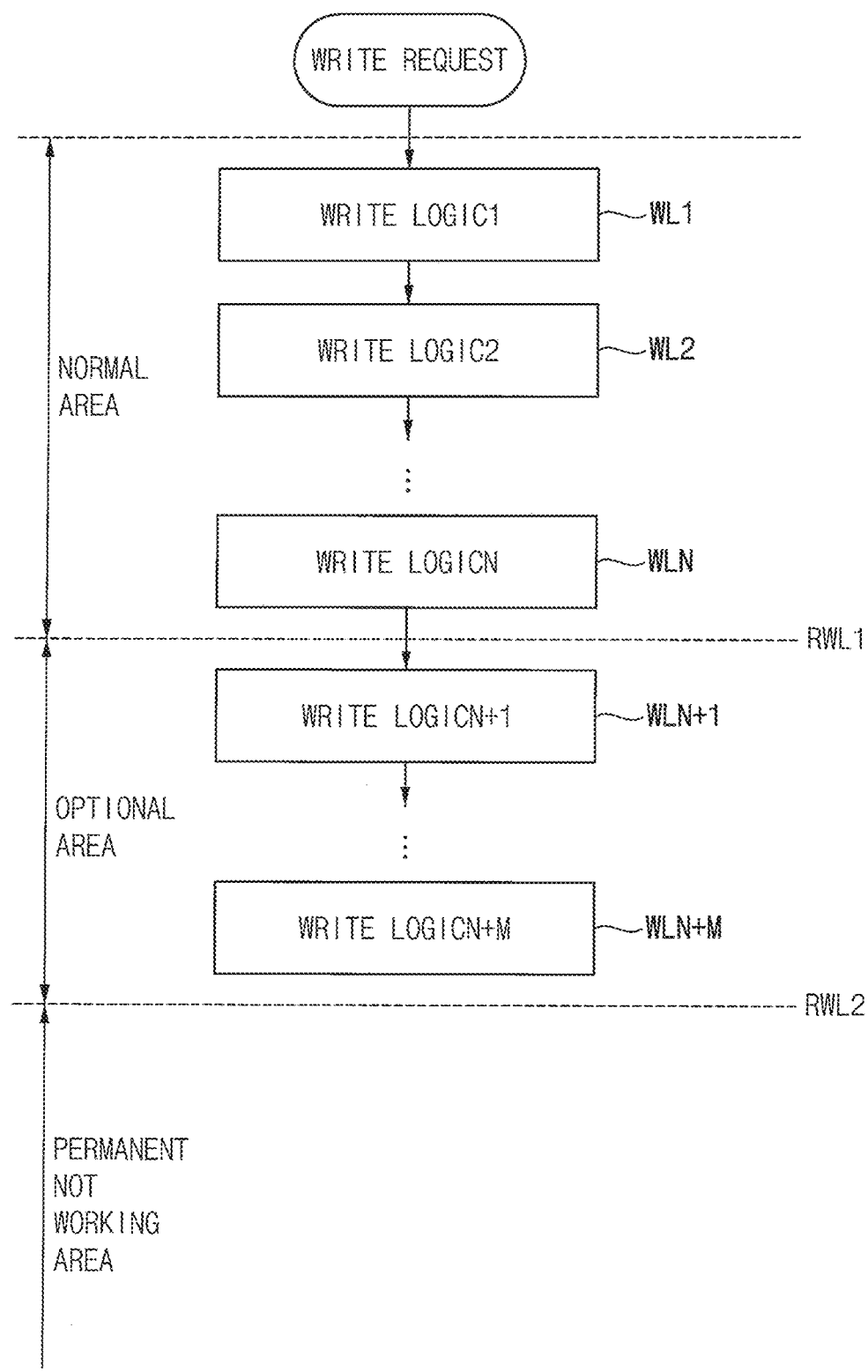
FIG. 6 is a diagram for describing an example of a normal area, an optional area and a permanent not working area.

FIG. 5 is a flowchart for describing an example where an optional area is detected in a method of operating a storage device according to example embodiments, and FIG. 6 is a diagram for describing an example of a normal area, an optional area and a permanent not working area.

Referring to FIGS. 2 and 5, a storage controller 210 may receive a write request for a memory block within a normal area 222 from a host (operation S110). For example, the write request may include a logical address corresponding to a physical address of the memory block, write data to be written to the memory block, and a write command indicating the write request.

The storage controller 210 may perform a write operation for the memory block in response to the write request (operation S120 and operation S130). For example, the storage controller 210 may set write logic for performing the write operation (operation S120), and may execute the write logic (operation S130). In a case where the write operation is not completed, or in a case where the write data are not normally written to the memory block by the write logic (operation S140: NO), the storage controller 210 may determine whether a time of the write operation exceeds a reference write latency (operation S160). If the time of the write operation does not exceed the reference write latency (operation S160: NO), the storage controller 210 may set another write logic (operation S120). For example, the storage controller 210 may set, but not limited to, default write logic, write logic for performing correction according to a retention value of the memory block, write logic for performing correction according to a program/erase (P/E) cycle, write logic for performing correction using a soft decision algorithm, write logic for performing correction using a machine learning defense code, write logic for performing an error recovery routine for each layer, or a combination thereof. The storage controller 210 may execute the another write logic (operation S130).

In a case where the write operation is completed, or in a case where the write data are normally written to the memory block by the write logic (operation S140: YES), the storage controller 210 may transfer a write success response to the host (operation S150). However, in a case where the write operation is not completed (operation S140: NO), and the time of the write operation exceeds the reference write latency (operation S160: YES), the storage controller 210 may set the memory block as an optional area 224 for storing optional data (operation S170), and may transfer a write fail response to the host (operation S180).

As described above, in a method of operating a storage device 200 according to example embodiments, in the case where (e.g., in response to a condition where) the time of the write operation for the memory block within the normal area 222 exceeds the reference write latency, the memory block may be set as the optional area 224. Further, in some example embodiments, in a case where the time of the write operation for the memory block exceeds a bad block reference write latency longer than the reference write latency, the memory block may be set as a permanent not working area 226 that is not used.

For example, as illustrated in FIG. 6, the storage controller 210 may sequentially execute N+M write logics WL1, WL2, ..., WLN, WLN+1, ..., WLN+M to perform the write operation for the memory block in response to the write request WRITE REQUEST, where each of N and M is an integer greater than 0. If the write operation is completed within the reference write latency RWL1, or if the write operation is completed by N or less write logics WL1 through WLN, the memory block may be maintained as the normal area 222. Alternatively, if the time of the write operation exceeds the reference write latency RWL1, but does not exceed the bad block reference write latency RWL2, or if the write operation is completed by up to (N+1)-th through (N+M)-th write logics WLN+1 through WLN+M, the memory block may be set as the optional area 224. Further, if the time of the write operation exceeds the bad block reference write latency RWL2, or if the write operation is not completed by the N+M write logics WL1 through WLN+M, the memory block may be set as the permanent not working area 226.

Figure 7:
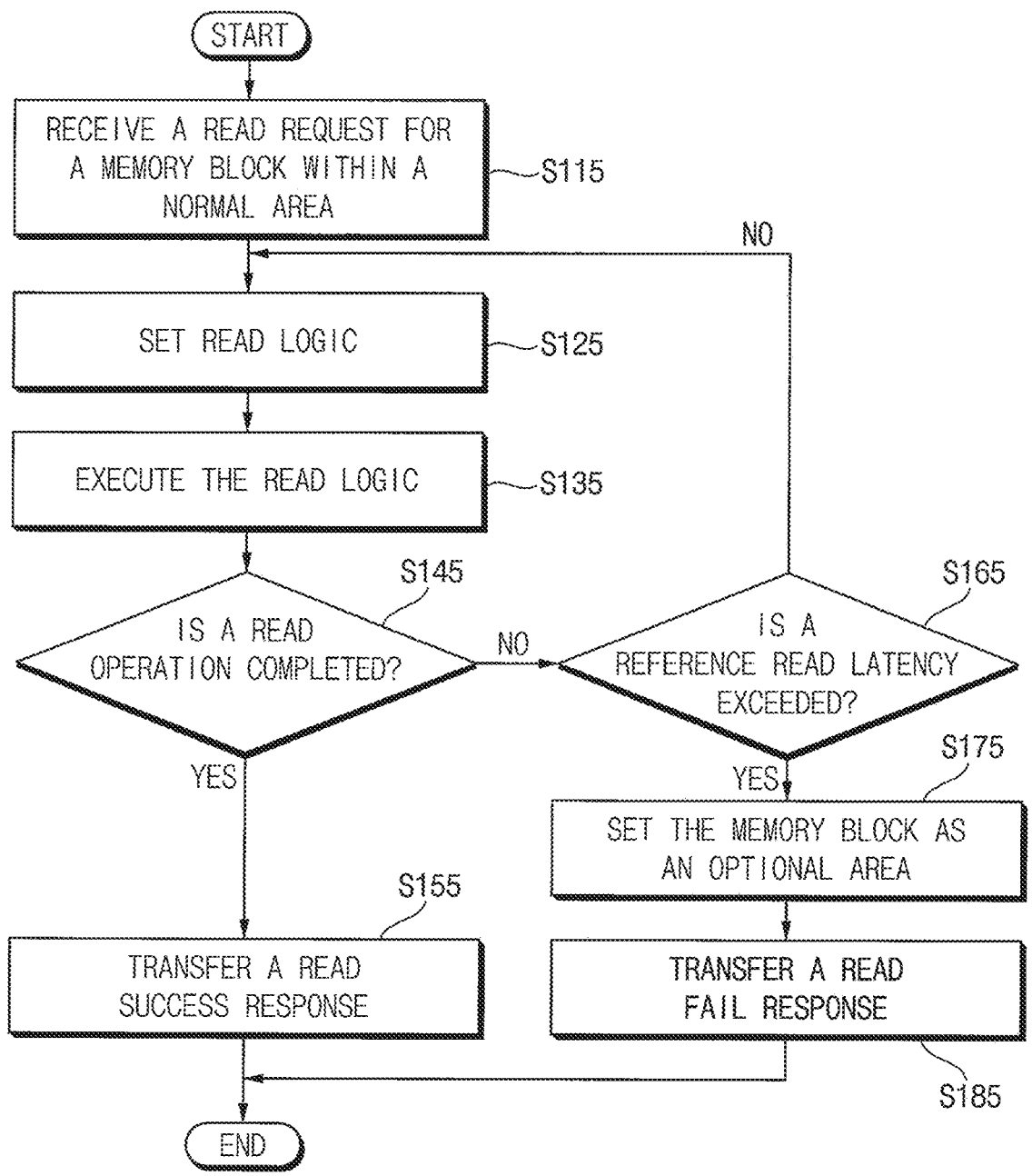
FIG. 7 is a flowchart for describing another example where an optional area is detected in a method of operating a storage device according to example embodiments.
Figure 8:
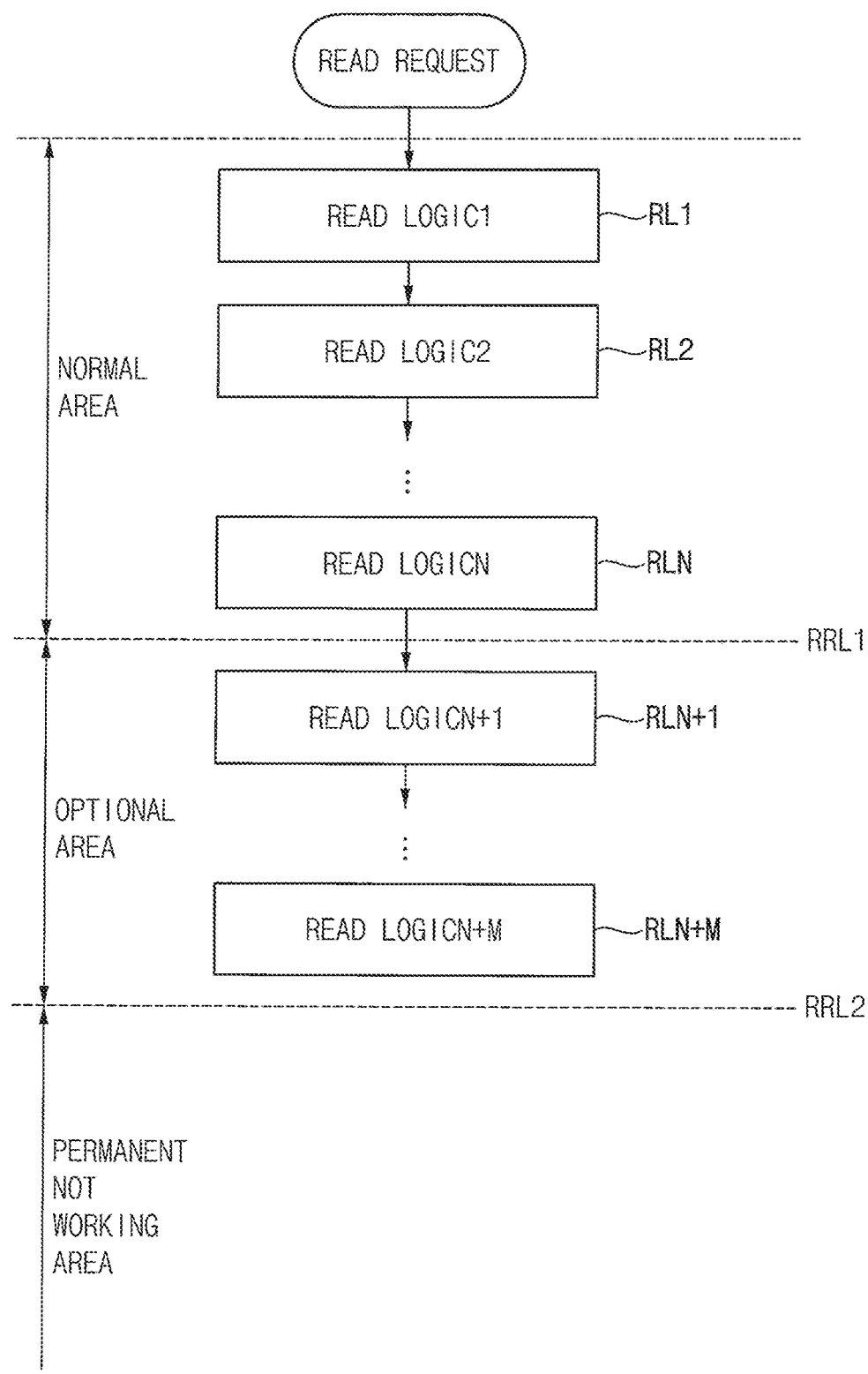
FIG. 8 is a diagram for describing another example of a normal area, an optional area and a permanent not working area.

FIG. 7 is a flowchart for describing another example where an optional area is detected in a method of operating a storage device according to example embodiments, and FIG. 8 is a diagram for describing another example of a normal area, an optional area, and a permanent not working area.

Referring to FIGS. 2 and 7, a storage controller 210 may receive a read request for a memory block within a normal area 222 from a host (operation S115). For example, the read request may include a logical address corresponding to a physical address of the memory block, and a read command indicating the read request.

The storage controller 210 may perform a read operation for the memory block in response to the read request (operation S125 and operation S135). For example, the storage controller 210 may set read logic for performing the read operation (operation S125), and may execute the read logic (operation S135). In a case where the read operation is not completed, or in a case where read data are not normally read from the memory block by the read logic (operation S145: NO), the storage controller 210 may determine whether a time of the read operation exceeds a reference read latency (operation S165). If the time of the read operation does not exceed the reference read latency (operation S165: NO), the storage controller 210 may set another read logic (operation S125). For example, the storage controller 210 may set, but not limited to, default read logic, read logic for performing correction according to a retention value of the memory block, read logic for performing correction by comparing a current temperature with a temperature stored in a nonvolatile memory device 220, read logic for performing correction using a soft decision algorithm, read logic for performing correction using a machine learning defense code, read logic for performing an error recovery routine for each layer, or a combination thereof. The storage controller 210 may execute the another read logic (operation S135).

In a case where the read operation is completed, or in a case where the read data are normally read from the memory block by the read logic (operation S145: YES), the storage controller 210 may provide the read data to the host, and may transfer a read success response to the host (operation S155). However, in a case where the read operation is not completed (operation S145: NO), and the time of the read operation exceeds the reference read latency (operation S165: YES), the storage controller 210 may set the memory block as an optional area 224 for storing optional data (operation S175), and may transfer a read fail response to the host (operation S185).

As described above, in a method of operating a storage device 200 according to example embodiments, in the case where the time of the read operation for the memory block within the normal area 222 exceeds the reference read latency, the memory block may be set as the optional area 224. Further, in some example embodiments, in a case where the time of the read operation for the memory block exceeds a bad block reference read latency longer than the reference read latency, the memory block may be set as a permanent not working area 226 that is not used.

For example, as illustrated in FIG. 8, the storage controller 210 may sequentially execute N+M read logics RL1, RL2, . . . , RLN, RLN+1, . . . , RLN+M to perform the read operation for the memory block in response to the read request READ REQUEST, where each of N and M is an integer greater than 0. If the read operation is completed within the reference read latency RRL1, or if the read operation is completed by N or less read logics RL1 through RLN, the memory block may be maintained as the normal area 222. Alternatively, if the time of the read operation exceeds the reference read latency RRL1, but does not exceed the bad block reference read latency RRL2, or if the read operation is completed by up to (N+1)-th through (N+M)-th read logics RLN+1 through RLN+M, the memory block may be set as the optional area 224. Further, if the time of the read operation exceeds the bad block reference read latency RRL2, or if the read operation is not completed by the N+M read logics RL1 through RLN+M, the memory block may be set as the permanent not working area 226.

Figure 9:
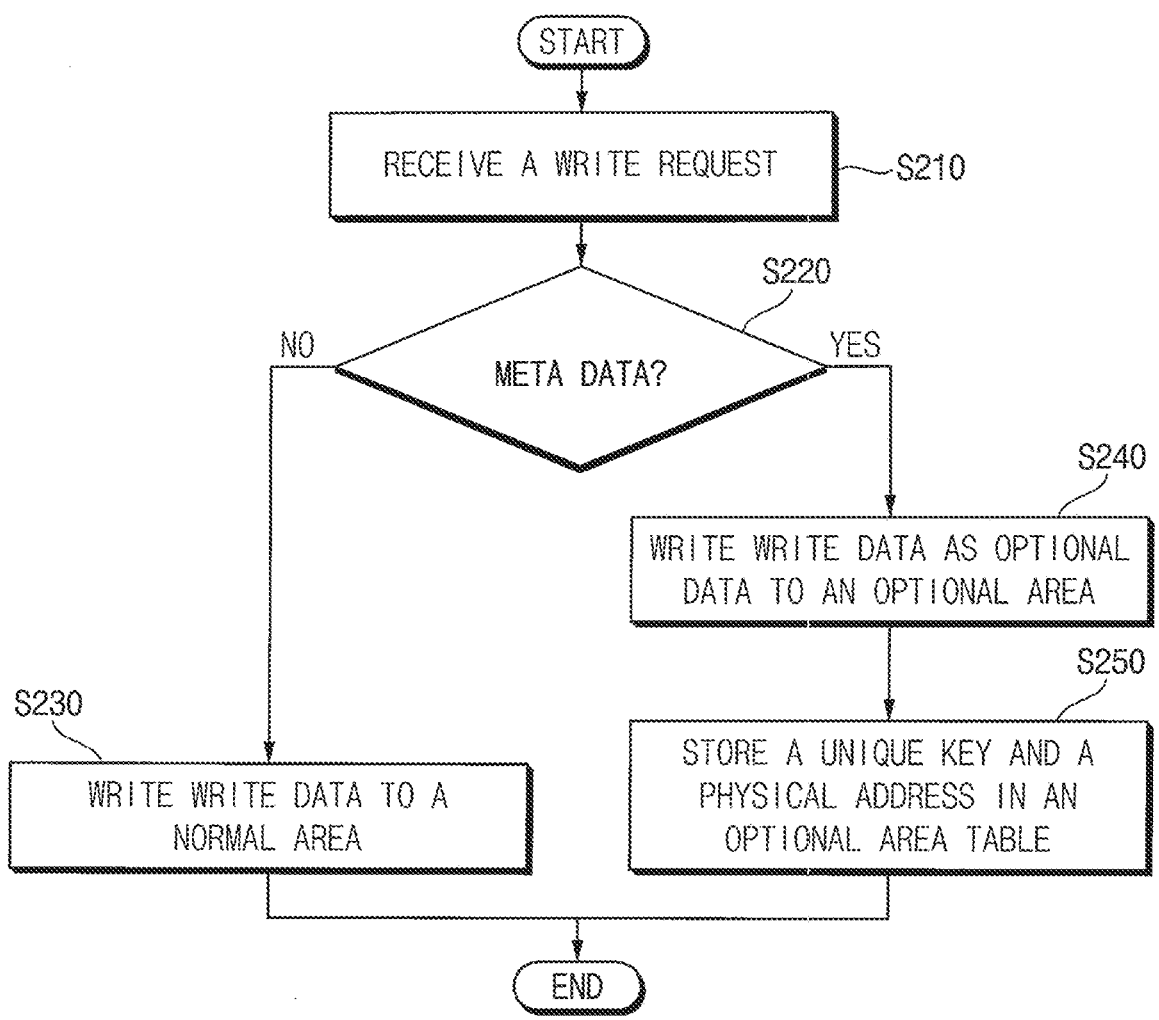
FIG. 9 is a flowchart for describing an example where optional data are written to an optional area in a method of operating a storage device according to example embodiments.
Figure 10:
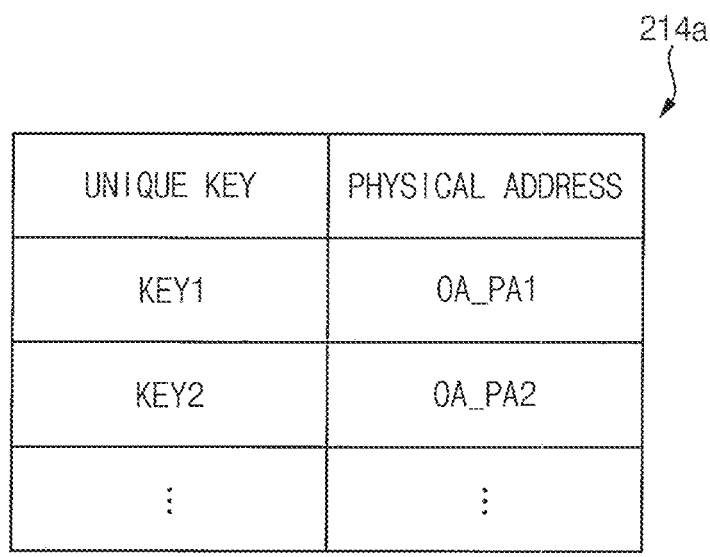
FIG. 10 is a diagram illustrating an example of an optional area table.

FIG. 9 is a flowchart for describing an example where optional data are written to an optional area in a method of operating a storage device according to example embodiments, and FIG. 10 is a diagram illustrating an example of an optional area table. In the present disclosure, the optional area table also may be referred to as a secondary area table.

Referring to FIGS. 2 and 9, in a method of operating a storage device 200 according to example embodiments, a storage controller 210 of the storage device 200 may receive a write request from a host (operation S210). The storage controller 210 may selectively perform a write operation for a normal area 222 or a write operation for an optional area 224 according to whether the write request includes meta data (operation S220, operation S230 and operation S240). In a case where the write request does not include the meta data (operation S220: NO), the storage controller 210 may perform the write operation for the normal area 222 (operation S230). For example, the storage controller 210 may write write data included in the write request to the normal area 222 based on a physical address to which a logical address included in the write request is mapped (operation S230).

In a case where the write request includes the meta data (operation S220: YES), the storage controller 210 may perform the write operation for the optional area 224 (operation S240). In some example embodiments, the write request may include the write data and the meta data, and the meta data may include a unique key for the write data. The storage controller 210 may write the write data as optional data to an empty storage space or a free storage space of the optional area 224 in response to the write request (operation S240).

After the write data are written to the optional area 224, the storage controller 210 may store the unique key for the write data and a physical address of the write data within the optional area 224 in an optional area table 214. For example, as illustrated in FIG. 10, if first write data of a first write request are written to a first physical address OA_PA1 of the optional area 224 in response to the first write request including a first unique key KEY1, the first unique key KEY1 and the first physical address OA_PA1 may be stored in an optional area table 214a. Further, if second write data of a second write request are written to a second physical address OA_PA2 of the optional area 224 in response to the second write request including a second unique key KEY2, the second unique key KEY2 and the second physical address OA_PA2 may be stored in the optional area table 214a.

Figure 11:
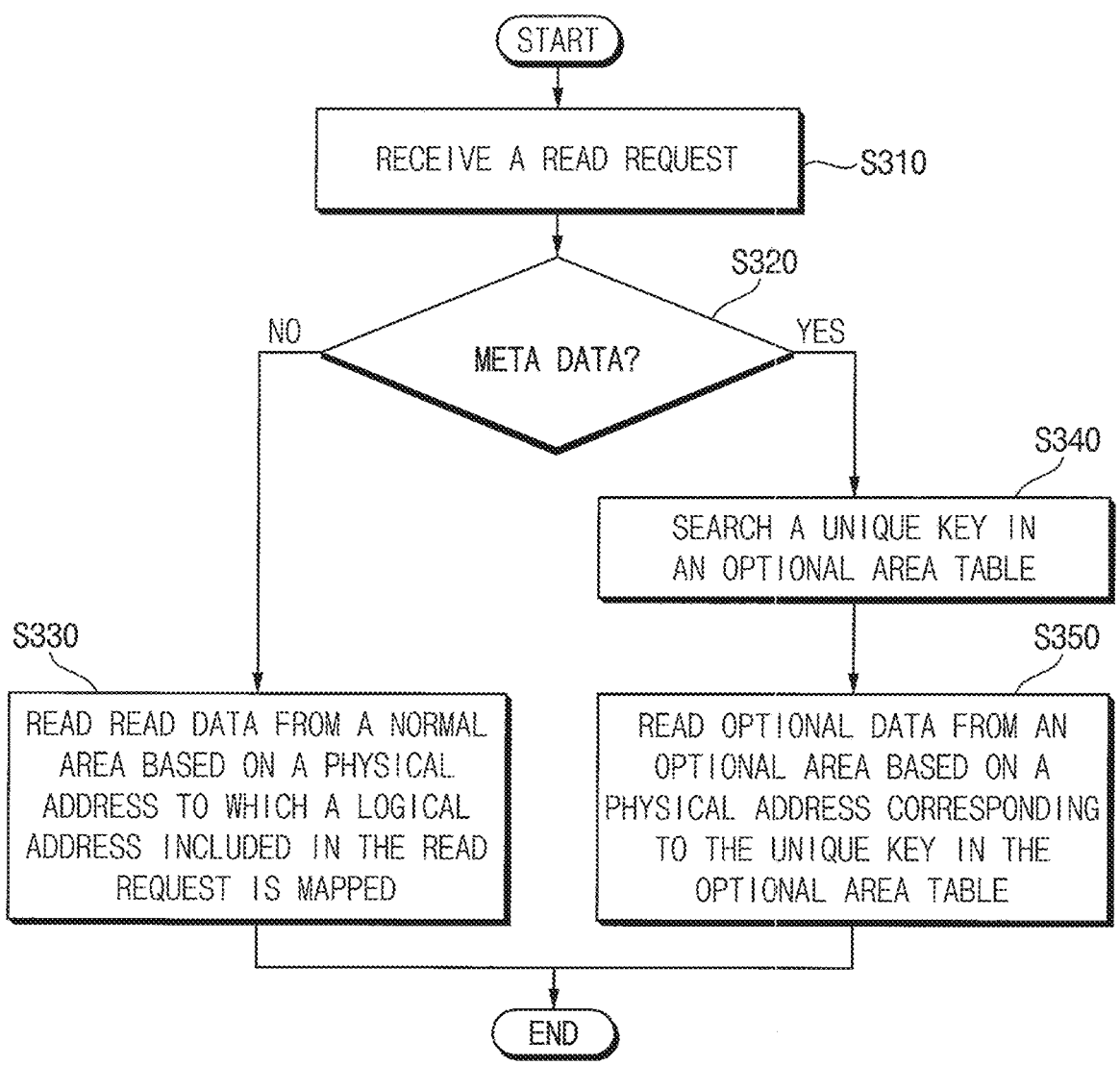
FIG. 11 is a flowchart for describing an example where optional data are read from an optional area in a method of operating a storage device according to example embodiments.

FIG. 11 is a flowchart for describing an example where optional data are read from an optional area in a method of operating a storage device according to example embodiments.

Referring to FIGS. 2 and 11, in a method of operating a storage device 200 according to example embodiments, a storage controller 210 of the storage device 200 may receive a read request from a host (operation S310). The storage controller 210 may selectively perform a read operation for a normal area 222 or a read operation for an optional area 224 according to whether the read request includes meta data (operation S320, operation S330, operation S340 and operation S350). In a case where the read request does not include the meta data (operation S320: NO), the storage controller 210 may perform the read operation for the normal area 222 (operation S330). For example, the storage controller 210 may read read data based on a physical address to which a logical address included in the read request is mapped (operation S330).

In a case where the read request includes the meta data (operation S320: YES), the storage controller 210 may perform the read operation for the optional area 224 (operation S340 and operation S350). In some example embodiments, the read request may not include the logical address, but may include the meta data. Further, the meta data may include a unique key. The storage controller 210 may search the unique key of the meta data in an optional area table 214 (operation S340). Further, the storage controller 210 may read optional data from the optional area 224 based on a physical address corresponding to the unique key in the optional area table 214 (operation S350). For example, in the storage device 200 including an optional area table 214a illustrated in FIG. 10, in a case where the meta data of the read request includes a first unique key KEY1, the storage controller 210 may read the optional data stored at a first physical address OA_PA1 of the optional area 224 based on the first physical address OA_PA1 corresponding to the first unique key KEY1.

Figure 12:
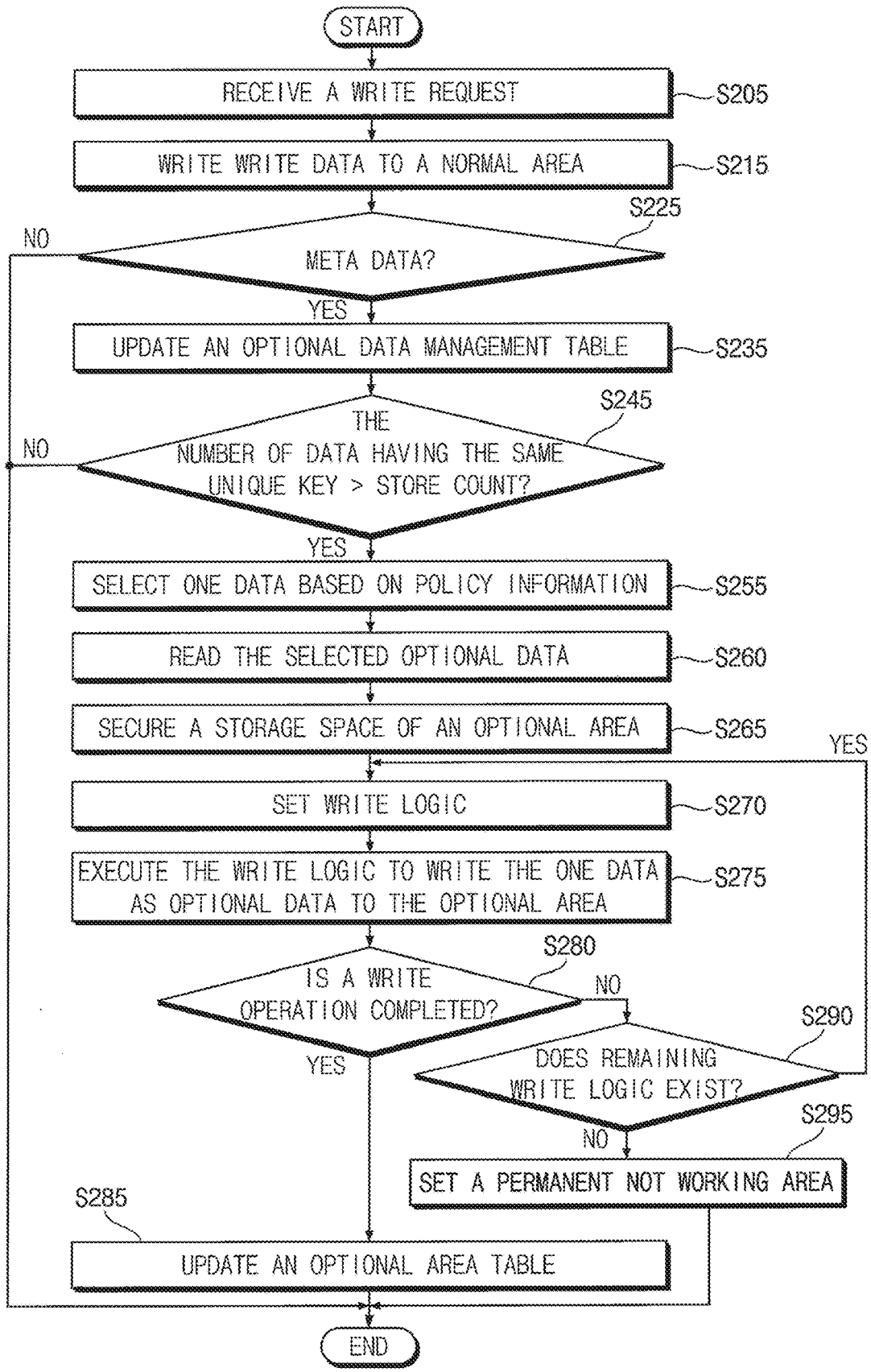
FIG. 12 is a flowchart for describing an example where optional data are written to an optional area in a method of operating a storage device according to example embodiments.
Figure 13:
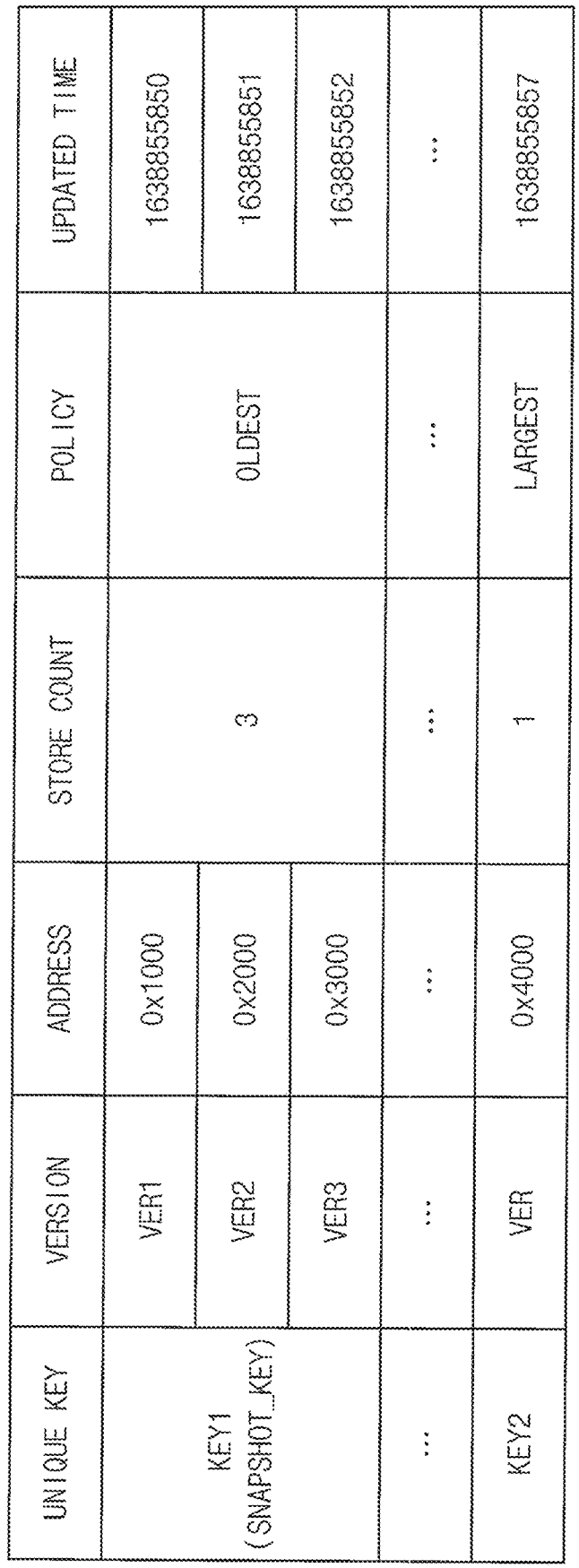
FIG. 13 is a diagram illustrating an example of an optional data management table.
Figure 15:
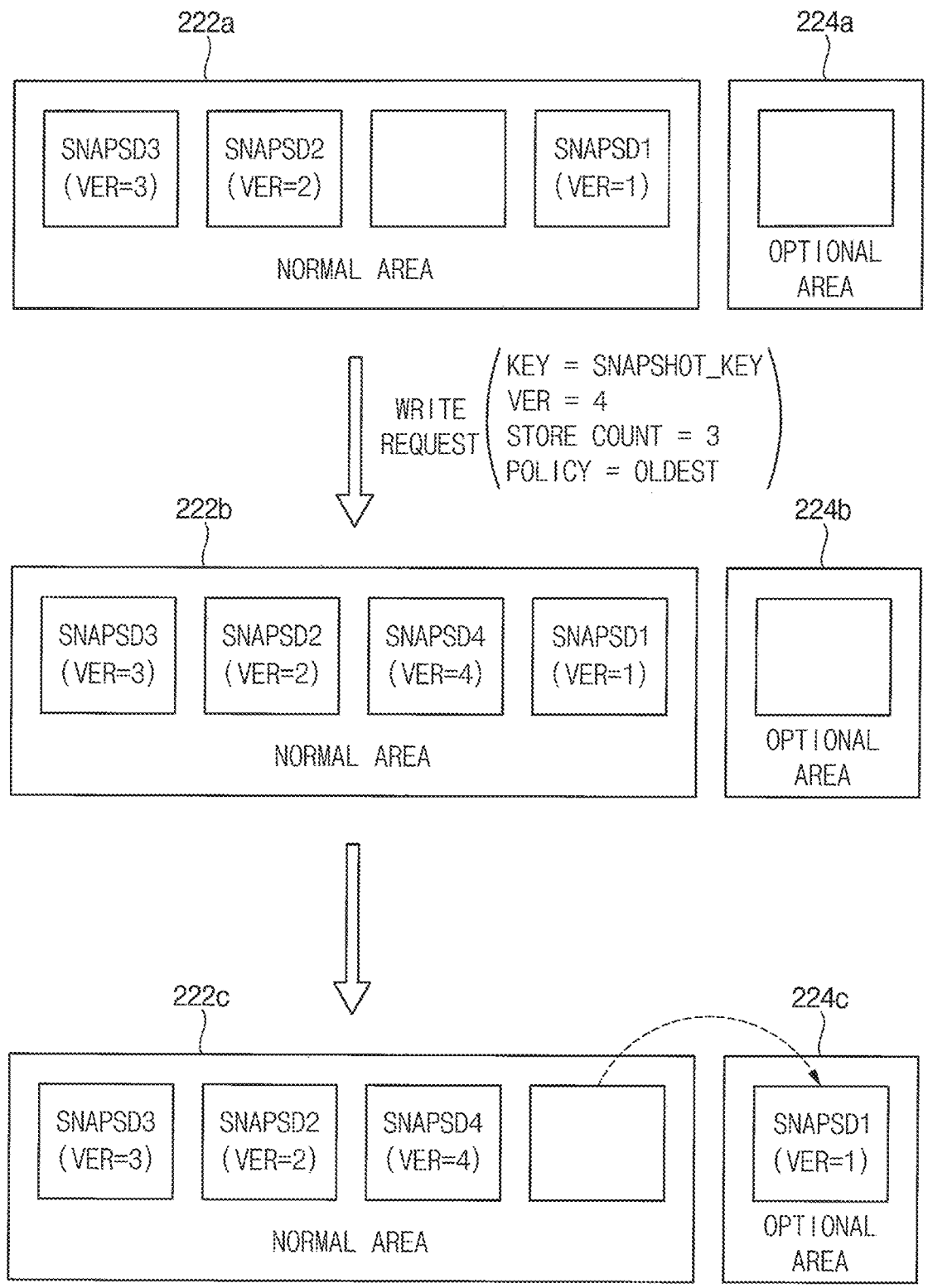
FIG. 15 is a diagram for describing an example where snapshot data are written as optional data to an optional area.

FIG. 12 is a flowchart for describing an example where optional data are written to an optional area in a method of operating a storage device according to example embodiments, FIG. 13 is a diagram illustrating an example of an optional data management table, FIG. 14 is a diagram illustrating another example of an optional area table, and FIG. 15 is a diagram for describing an example where snapshot data are written as optional data to an optional area.

Referring to FIGS. 2 and 12, in a method of operating a storage device 200 according to example embodiments, a storage controller 210 of the storage device 200 may receive a write request from a host (operation S205), and may perform a write operation for a normal area 222 in response to the write request (operation S215). The write request may include a logical address, write data and a write command, and the storage controller 210 may write the write data to the normal area 222 based on a physical address to which the logical address is mapped. In a case where the write request does not include meta data (operation S225: NO), an operation of the storage device 200 responding to the write request may be completed.

Alternatively, if the write request includes the meta data (operation S225: YES), the storage controller 210 may update an optional data management table 216 (operation S235). In some example embodiments, when the host transfers a write request for optional data to be written to an optional area 224, the write request may include the meta data. The meta data may include a unique key, a version value, a store count and policy information for the write data included in the write request, or for the optional data to be written to the optional area 224. The storage controller 210 may add or update the unique key, the version value, the store count and the policy information for the write data or the optional data included in the write request in the optional data management table 216.

For example, as illustrated in FIG. 13, the optional data management table 216 for managing optional data stored in the normal area 222 may store a unique key, a version value, an address, a store count, policy information and an update time for the optional data stored in the normal area 222. The unique key may be used to specify the optional data. For example, a first unique key KEY1 may be assigned to first optional data, and a second unique key KEY2 different from the first unique key KEY1 may be assigned to second optional data different from the first optional data. In an example, the first optional data may be, but not be limited to, snapshot data, and the first unique key KEY1 may be a unique key SNAPSHOT_KEY for the snapshot data. The version value may be used to distinguish between different versions of the same optional data or the same type of optional data. For example, each time the host requests a write operation for the snapshot data, the host may gradually increase a version value for the snapshot data from a first version value VER1 to a second version value VER2 higher than the first version value VER1, and to a third version value VERS higher than the second version value VER2. Further, the second optional data having the second unique key KEY2 may have a version value VER for the second optional data. The address is an address (e.g., a logical address or a physical address) of the normal area 222 at which the optional data are stored. The store count may represent the number of the same optional data retained in the normal area 222. The policy information may be used in determining optional data to be moved from the normal area 222 to the optional area 224. For example, the policy information may have, but not limited to, one of a first value representing oldest data OLDEST, a second value representing data having a lowest version value, a third value representing data having a largest size LARGEST, and a fourth value representing data having a smallest size. In some example embodiments, with respect to each optional data, the store count and the policy information may be updated to the most recently received store count and policy information from the host. The update time may represent a time at which each optional data are stored in the normal area 222, and may have a timestamp value.

The storage controller 210 may check the number of the optional data stored in the normal area 222 which have the unique key of the meta data of the write request by referring to the optional data management table 216, and may compare the number of the optional data having a unique key the same as the unique key of the meta data with the store count of the meta data (operation S245). In a case where the number of the optional data having the same unique key is less than or equal to the store count (operation S245: NO), an operation of the storage device 200 responding to the write request may be completed.

Alternatively, in a case where the number of the optional data having the same unique key and different version values is greater than the store count (operation S245: YES), the storage controller 210 may move the optional data from the normal area 222 to the optional area 224 based on the meta data of the write request (operation S255 through operation S285).

In some example embodiments, the storage controller 210 may select one optional data to be moved from the normal area 222 to the optional area 224 from the optional data having the different version values based on the policy information of the meta data (operation S255). For example, according to the policy information, oldest data, data having a lowest version value, data having a largest size, or data having a smallest size may be selected from the optional data having the different version values.

The storage controller 210 may read the selected optional data from the normal area 222 (operation S260). For example, the storage controller 210 may obtain an address for the selected optional data in the optional data management table 216, and may read the selected optional data from the normal area 222 based on the obtained address.

The storage controller 210 may secure an empty or free storage space of the optional area 224 (operation S265). For example, in a case where the optional area 224 has no empty storage space for storing the selected optional data, the storage controller 210 may erase, but not limited to, a memory block of the optional area 224 storing the oldest optional data.

The storage controller 210 may write the selected optional data read from the normal area 222 to the optional area 224 (operation S270, operation S275 and operation S280). For example, the storage controller 210 may set write logic (operation S270), and may execute the write logic to write the optional data to the optional area 224 (operation S275). In a case where a write operation is not normally completed (operation S280: NO), the storage controller 210 may set another write logic (operation S290: YES and operation S270), and may execute the another write logic (operation S275). In a case where the write operation is normally completed (operation S280: YES), the storage controller 210 may add or update information for the optional data in an optional area table 214 (operation S285). For example, as illustrated in FIG. 14, an optional area table 214b may store a unique key, a version value, a physical address and an update time for the optional data stored in the optional area 224. If the selected optional data are written to the optional area 224, the storage controller 210 may add or update the unique key of the meta data of the write request, a version value of the selected optional data, a physical address of the optional area 224 at which the selected optional data are stored, and a time at which the selected optional data are stored in the optional area 224 to the optional area table 214b.

Alternatively, in a case where the write operation is not normally completed although all write logics of the storage controller 210 are executed (operation S280: NO and operation S290: NO), a memory block of the optional area 224 for which the write operation is performed may be set as a permanent not working area 226 (operation S295), and the storage controller 210 may inform the host of a failure of writing the optional data to the optional area 224.

As described above, in the method of operating the storage device 200 according to example embodiments, the optional data stored in the normal area 222 may be managed by using the optional data management table 216, and the storage controller 210 may move the optional data stored in the normal area 222 to the optional area 224 by using the optional data management table 216.

FIG. 15 illustrates an example of the storage device 200 where first snapshot data SNAPSD1 having a version value VER of 1, second snapshot data SNAPSD2 having a version value VER of 2 and third snapshot data SNAPSD3 having a version value VER of 3 are stored in a normal area 222a, and no snapshot data is stored in an optional area 224a. In a case where the storage device 200 receive a write request, and meta data of the write request include a snapshot key SNAPSHOT_KEY as a unique key KEY, a version value VER of 4, a store count STORE COUNT of 3 and policy information POLICY representing oldest data OLDEST, the storage controller 210 may write fourth snapshot data SNAPSD4 having the version value VER of 4 to the normal area 222b. Further, since the number of the snapshot data SNAPSD1, SNAPSD2, SNAPSD3 and SNAPSD4 stored in the normal area 222b is greater than the store count STORE COUNT of 3, the storage controller 210 may select snapshot data SNAPSD1 to be moved to the optional area 224b based on the policy information POLICY. Since the policy information POLICY represents the oldest data OLDEST, the storage controller 210 may select the first snapshot data SNAPSD1 that are oldest among the snapshot data SNAPSD1, SNAPSD2, SNAPSD3 and SNAPSD4. The storage controller 210 may move the first snapshot data SNAPSD1 from the normal area 222c to the optional area 224c. Thus, since the optional area 224c is used as a storage space, a storage space of the storage device 200 may be expanded, and the storage device 200 may be efficiently used.

Figure 16:
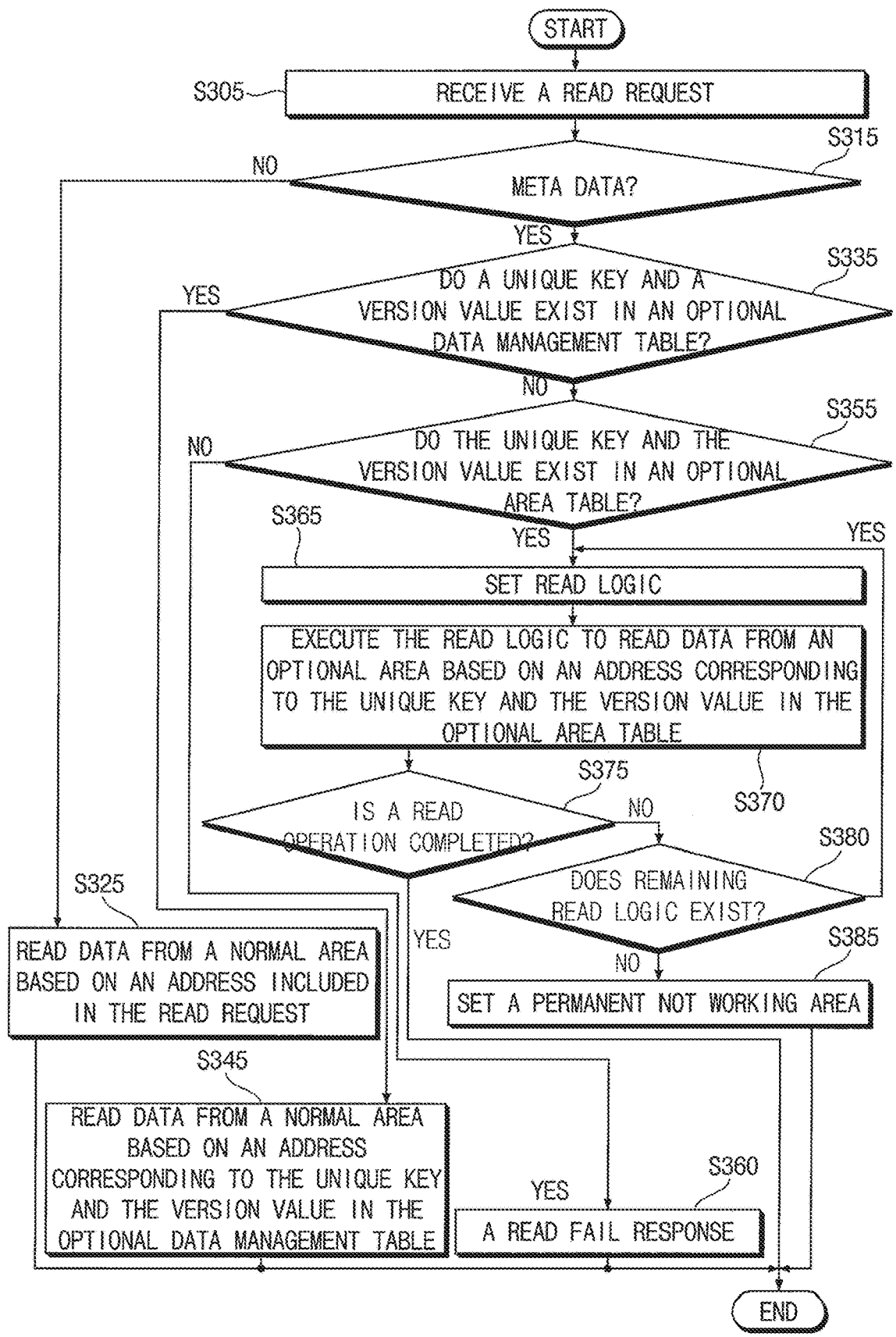
FIG. 16 is a flowchart for describing an example where optional data are read from an optional area in a method of operating a storage device according to example embodiments.

FIG. 16 is a flowchart for describing an example where optional data are read from an optional area in a method of operating a storage device according to example embodiments.

Referring to FIGS. 2 and 16, in a method of operating a storage device 200 according to example embodiments, a storage controller 210 of the storage device 200 may receive a read request from a host (operation S305), and may determine whether the read request includes meta data (operation S315). In a case where the read request does not include the meta data (operation S315: NO), the storage controller 210 may read first read data from a normal area 222 based on a first physical address to which a logical address included in the read request is mapped (operation S325).

Alternatively, when the host transfers a read request for optional data, the read request may include the meta data having a unique key and a version value. If the read request includes the meta data (operation S315: YES), the storage controller 210 may search the unique key and the version value of the meta data in an optional data management table 216 for managing the optional data stored in the normal area 222 (operation S335). In a case where the unique key and the version value exist in the optional data management table 216 (operation S335: YES), the storage controller 210 may read second read data from the normal area 222 based on a second physical address corresponding to the unique key and the version value in the optional data management table 216 (operation S345).

In a case where the unique key and the version value do not exist in the optional data management table 216 (operation S335: NO), the storage controller 210 may search the unique key and the version value in an optional area table 214 for managing the optional data stored in an optional area 224 (operation S355). In a case where the unique key and the version value do not exist in the optional area table 214 (operation S355: NO), the storage controller 210 may transfer a read fail response to the host (operation S360).

Alternatively, in a case where the unique key and the version value exist in the optional area table 214 (operation S355: YES), the storage controller 210 may read the optional data from the optional area 224 based on a third physical address corresponding to the unique key and the version value in the optional area table 214 (operation S365, operation S370 and operation S375). For example, the storage controller 210 may set read logic (operation S365), and may execute the read logic to read the optional data from the optional area 224 (operation S370). In a case where a read operation is not normally completed (operation S375: NO), the storage controller 210 may set another read logic (operation S380: YES and operation S365), and may execute the another read logic (operation S370). In a case where the read operation is normally completed (operation S375: YES), the storage controller 210 may provide the optional data to the host. Alternatively, in a case where the read operation is not normally completed although all read logics of the storage controller 210 are executed (operation S375: NO and operation S380: NO), a memory block of the optional area 224 for which the read operation is performed may be set as a permanent not working area 226 (operation S385), and the storage controller 210 may inform the host of a failure of reading the optional data from the optional area 224.

Figure 17:
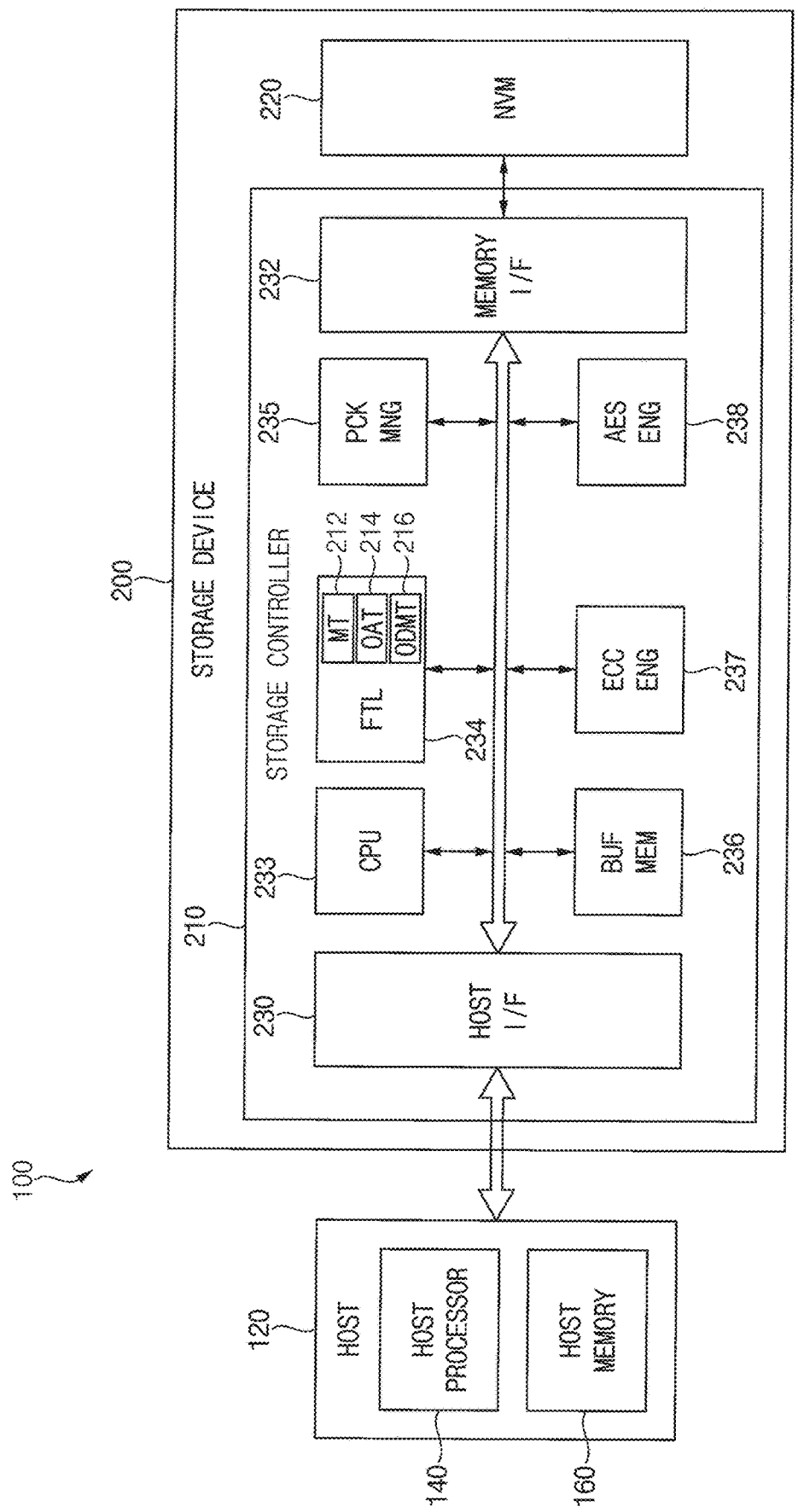
FIG. 17 is a block diagram illustrating a computing system according to example embodiments.

FIG. 17 is a block diagram illustrating a computing system according to example embodiments.

Referring to FIG. 17, a computing system 100 may include a storage device 200 and a host 120 storing data in the storage device 200. In some example embodiments, the computing system 100 may be any computing system, such as a personal computer (PC), a server computer, a data center, a workstation, a digital television (TV), a set-top box, etc. In other example embodiments, the computing system 100 may be any mobile system, such as a mobile phone, a smart phone, a tablet computer, a laptop computer, a personal digital assistant (PDA), a portable multimedia player (PMP), a digital camera, a camcorder, a portable game console, a music player, a video player, a navigation device, a wearable device, an internet of things (IoT) device, an internet of everything (IoE) device, an e-book reader, a virtual reality (VR) device, an augmented reality (AR) device, a robotic device, a drone, etc.

The host 120 may include a host processor 140 and a host memory 160. The host processor 140 may transfer data stored in the host memory 160 as write data to the storage device 200, or may store read data read from the storage device 200 in the host memory 160.

In some example embodiments, the host processor 140 and the host memory 160 may be implemented as separate semiconductor chips. Alternatively, in other example embodiments, the host processor 140 and the host memory 160 may be integrated in the same semiconductor chip. As an example, the host processor 140 may be any one of a plurality of modules included in an application processor (AP). The AP may be implemented as a System on Chip (SoC). Further, the host memory 160 may be an embedded memory included in the AP, or a nonvolatile memory device (NVM) or a memory module located outside the AP.

The storage device 200 may include a storage controller 210 and a nonvolatile memory device (hereinafter, "NVM") 220. In some example embodiments, the NVM 220 may include a flash memory, and the flash memory may include a 2D NAND memory array or a 3D (or vertical) NAND (VNAND) memory array. In other example embodiments, the NVM 220 may include various other kinds of NVMs, such as, an MRAM, a spin-transfer torque MRAM, a conductive bridging RAM (CBRAM), an FRAM, PRAM, RRAM, and various other kinds of memories.

The storage controller 210 may include a host interface 230, a memory interface 232, a central processing unit (CPU) 233 and a buffer memory 236. The storage controller 210 may further include a flash translation layer (FTL) 234, a packet manager 235, an error correction code (ECC) engine 237 and an advanced encryption standard (AES) engine 238. The storage controller 210 may further include a working memory (not shown) in which the FTL 234 is loaded, and the CPU 233 may execute the FTL 234 to control data write and read operations on the NVM 220.

The host interface 230 may transmit and receive packets to and from the host 120. A packet transmitted from the host 120 to the host interface 230 may include a command or data to be written to the NVM 220. A packet transmitted from the host interface 230 to the host 120 may include a response to the command or data read from the NVM 220. The memory interface 232 may transmit data to be written to the NVM 220 to the NVM 220, or may receive data read from the NVM 220. The memory interface 232 may be configured to comply with a standard protocol, such as Toggle or open NAND flash interface (ONFI).

The FTL 234 may perform various functions, such as an address mapping operation, a wear-leveling operation, and a garbage collection operation. The address mapping operation may be an operation of converting a logical address received from the host 120 into a physical address used to actually store data in the NVM 220. The wear-leveling operation may be a technique for reducing or preventing excessive deterioration of a specific block by allowing blocks of the NVM 220 to be uniformly used. As an example, the wear-leveling operation may be implemented using a firmware technique that balances erase counts of physical blocks. The garbage collection operation may be a technique for ensuring usable capacity in the NVM 220 by erasing an existing block after copying valid data of the existing block to a new block. In some example embodiments, the FTL 234 may include and manage a mapping table (MT) 212 that maps a logical address of the host 120 to a physical address of the NVM 220, an optional area table (OAT) 214 that manages optional data stored in an optional area of the NVM 220, and an optional data management table (ODMT) 216 that manages optional data stored in a normal area of the NVM 220.

The packet manager 235 may generate a packet according to a protocol of an interface, which consents to the host 120, or parse various types of information from the packet received from the host 120. In addition, the buffer memory 236 may includes a write buffer WB that temporarily stores write data to be written to the NVM 220, a read buffer RB that temporarily stores read data read from the NVM 220, and an internal buffer for an internal operation. Although the buffer memory 236 may be a component included in the storage controller 210, the buffer memory 236 may be outside the storage controller 210.

The ECC engine 237 may perform error detection and correction operations on read data read from the NVM 220. For example, the ECC engine 237 may generate parity bits for write data to be written to the NVM 220, and the generated parity bits may be stored in the NVM 220 together with write data. During the reading of data from the NVM 220, the ECC engine 237 may correct an error in the read data by using the parity bits read from the NVM 220 along with the read data, and output error-corrected read data.

The AES engine 238 may perform at least one of an encryption operation and a decryption operation on data input to the storage controller 210 by using a symmetric-key algorithm.

Figure 18:
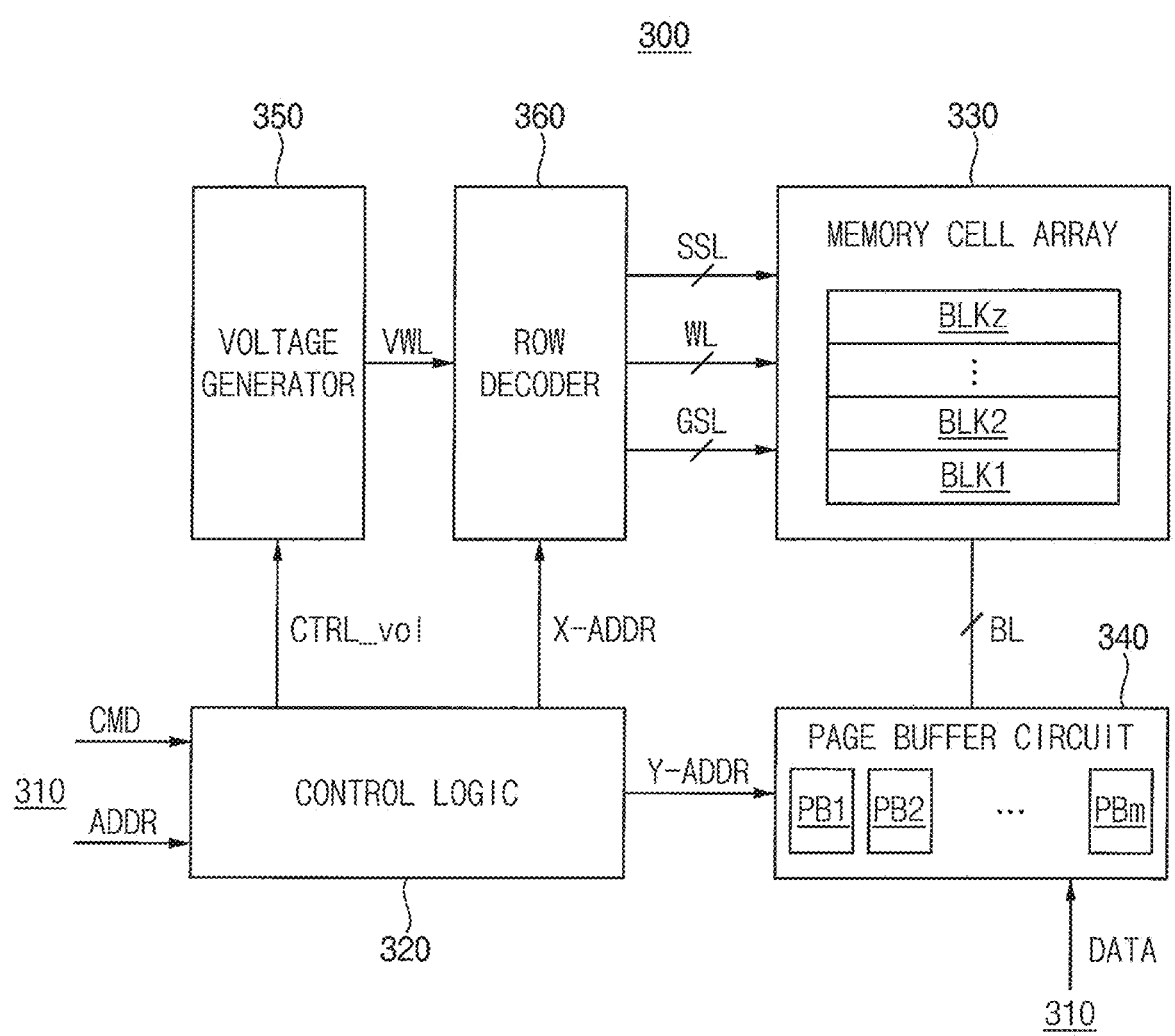
FIG. 18 is a block diagram illustrating an example of a nonvolatile memory device included in a storage device according to example embodiments.

FIG. 18 is a block diagram illustrating an example of a nonvolatile memory device included in a storage device according to example embodiments.

Referring to FIG. 18, a nonvolatile memory device 300 may include a memory cell array 330, and a control circuit that performs an operation for the memory cell array 330. The control circuit may include a control logic circuitry 320, a page buffer circuit 340, a voltage generator 350 and a row decoder 360. Although not shown in FIG. 18, the nonvolatile memory device 300 may further include an interface circuitry 310. In addition, the memory device 300 may further include column logic, a pre-decoder, a temperature sensor, a command decoder, and/or an address decoder.

The control logic circuitry 320 may control all various operations of the nonvolatile memory device 300. The control logic circuitry 320 may output various control signals in response to commands CMD and/or addresses ADDR from the interface circuitry 310. For example, the control logic circuitry 320 may output a voltage control signal CTRL_vol, a row address X-ADDR, and a column address Y-ADDR.

The memory cell array 330 may include a plurality of memory blocks BLK1 to BLKz (here, z is a positive integer), each of which may include a plurality of memory cells. The memory cell array 330 may be connected to the page buffer circuit 340 through bitlines BL and be connected to the row decoder 360 through wordlines WL, string selection lines SSL, and ground selection lines GSL.

In some example embodiments, the memory cell array 330 may include a 3D memory cell array, which includes a plurality of NAND strings. Each of the NAND strings may include memory cells respectively connected to wordlines vertically stacked on a substrate. The entire disclosures of U.S. Pat. Nos. 7,679,133; 8,553,466; 8,654,587; 8,559,235; and US Pat. Pub. No. 2011/0233648 are hereby incorporated by reference; however, in the event of any conflict or inconsistency between terms used herein and terms of the incorporated references, the terms used in this specification take precedence over the terms of the incorporated references. In some example embodiments, the memory cell array 330 may include a 2D memory cell array, which includes a plurality of NAND strings arranged in a row direction and a column direction.

The page buffer circuit 340 may include a plurality of page buffers PB1 to PBm (here, m is an integer greater than or equal to 3), which may be respectively connected to the memory cells through a plurality of bitlines BL. The page buffer circuit 340 may select at least one of the bitlines BL in response to the column address Y-ADDR. The page buffer circuit 340 may operate as a write driver or a sense amplifier according to an operation mode. For example, during a program operation, the page buffer circuit 340 may apply a bitline voltage corresponding to data to be programmed, to the selected bitline. During a read operation, the page buffer circuit 340 may sense current or a voltage of the selected bitline BL and sense data stored in the memory cell.

The voltage generator 350 may generate various kinds of voltages for program, read, and erase operations based on the voltage control signal CTRL_vol. For example, the voltage generator 350 may generate a program voltage, a read voltage, a program verification voltage, and an erase voltage as a wordline voltage VWL.

The row decoder 360 may select one of a plurality of wordlines WL and select one of a plurality of string selection lines SSL in response to the row address X-ADDR. For example, the row decoder 360 may apply the program voltage and the program verification voltage to the selected wordline WL during a program operation and apply the read voltage to the selected word line WL during a read operation.

Figure 19:
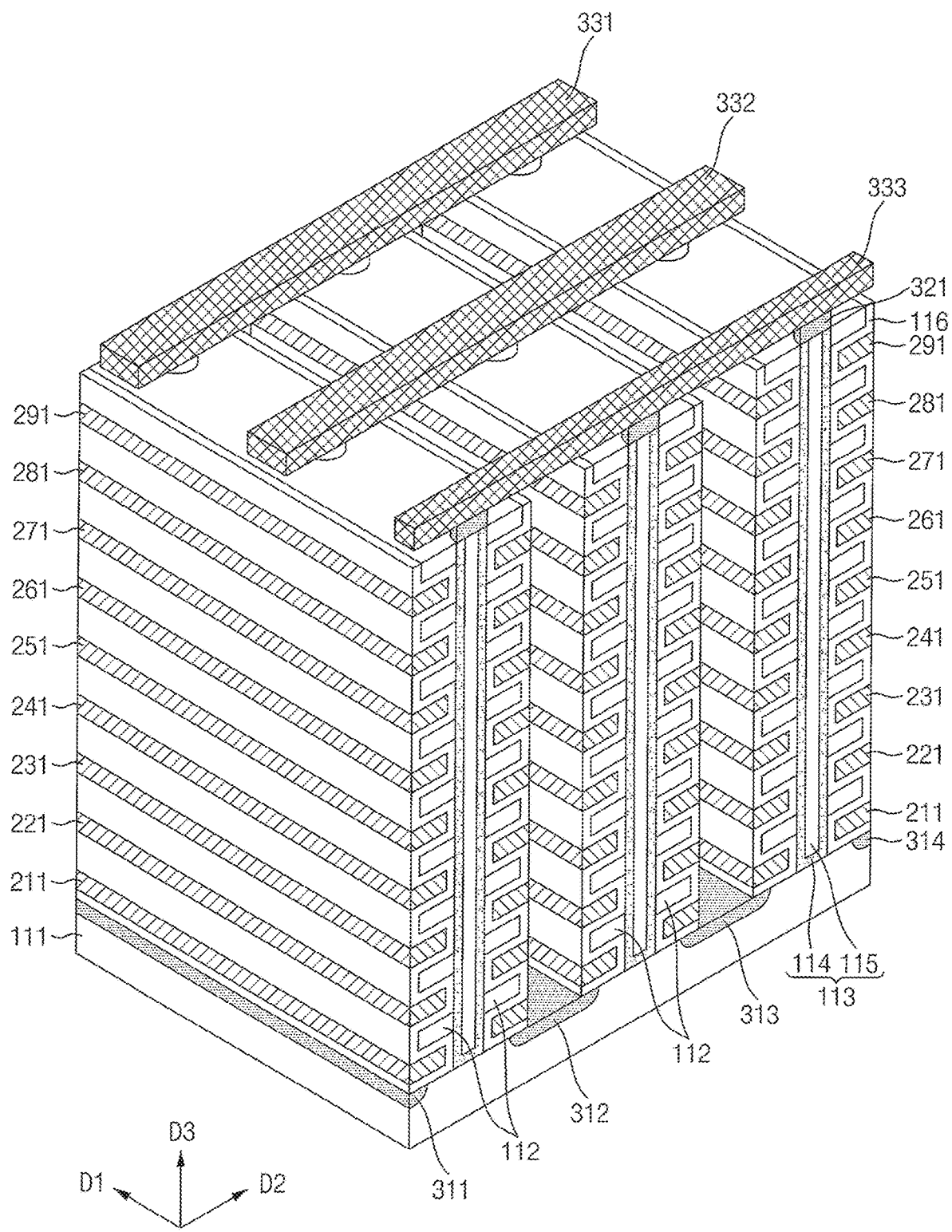
FIG. 19 is a perspective view illustrating an example of a memory block included in a memory cell array of a nonvolatile memory device of FIG. 18.

FIG. 19 is a perspective view illustrating an example of a memory block included in a memory cell array of a non-volatile memory device of FIG. 18.

Referring to FIG. 19, a memory block BLKi includes a plurality of cell strings (e.g., a plurality of vertical NAND strings) which are formed on a substrate in a three-dimensional structure (or a vertical structure). The memory block BLKi includes structures extending along first, second and third directions D1, D2 and D3.

A substrate 111 is provided. For example, the substrate 111 may have a well of a first type of charge carrier impurity (e.g., a first conductivity type) therein. For example, the substrate 111 may have a p-well formed by implanting a group 3 element such as boron (B). In particular, the substrate 111 may have a pocket p-well provided within an n-well. In some example embodiments, the substrate 111 has a p-type well (or a p-type pocket well). However, the conductivity type of the substrate 111 is not limited to p-type.

A plurality of doping regions 311, 312, 313 and 314 arranged along the second direction D2 are provided in/on the substrate 111. This plurality of doping regions 311 to 314 may have a second type of charge carrier impurity (e.g., a second conductivity type) different from the first type of the substrate 111. In some example embodiments of the inventive concepts, the first to fourth doping regions 311 to 314 may have n-type. However, the conductivity type of the first to fourth doping regions 311 to 314 is not limited to n-type.

A plurality of insulation materials 112 extending along the first direction D1 are sequentially provided along the third direction D3 on a region of the substrate 111 between the first and second doping regions 311 and 312. For example, the plurality of insulation materials 112 are provided along the third direction D3, being spaced by a specific distance. For example, the insulation materials 112 may include or may be formed of an insulation material such as an oxide layer.

A plurality of pillars 113 penetrating the insulation materials along the third direction D3 are sequentially disposed along the first direction D1 on a region of the substrate 111 between the first and second doping regions 311 and 312. For example, the plurality of pillars 113 penetrates the insulation materials 112 to contact the substrate 111.

In some example embodiments, each pillar 113 may include a plurality of materials. For example, a channel layer 114 of each pillar 113 may include or may be formed of a silicon material having a first conductivity type. For example, the channel layer 114 of each pillar 113 may include or may be formed of a silicon material having the same conductivity type as the substrate 111. In some example embodiments of the inventive concepts, the channel layer 114 of each pillar 113 includes or is formed of p-type silicon. However, the channel layer 114 of each pillar 113 is not limited to the p-type silicon.

An internal material 115 of each pillar 113 includes an insulation material. For example, the internal material 115 of each pillar 113 may include or may be formed of an insulation material such as a silicon oxide. In some examples, the internal material 115 of each pillar 113 may include an air gap. The term "air" as discussed herein, may refer to atmospheric air, or other gases that may be present during the manufacturing process.

An insulation layer 116 is provided along the exposed surfaces of the insulation materials 112, the pillars 113, and the substrate 111, on a region between the first and second doping regions 311 and 312. For example, the insulation layer 116 provided on surfaces of the insulation material 112 may be interposed between pillars 113 and a plurality of stacked first conductive materials 211, 221, 231, 241, 251, 261, 271, 281 and 291, as illustrated. In some examples, the insulation layer 116 need not be provided between the first conductive materials 211 to 291 corresponding to ground selection lines GSL (e.g., 211) and string selection lines SSL (e.g., 291). For example, the ground selection lines GSL are the lowermost ones of the stack of first conductive materials 211 to 291 and the string selection lines SSL are the uppermost ones of the stack of first conductive materials 211 to 291.

The plurality of first conductive materials 211 to 291 are provided on surfaces of the insulation layer 116, in a region between the first and second doping regions 311 and 312. For example, the first conductive material 211 extending along the first direction D1 is provided between the insulation material 112 adjacent to the substrate 111 and the substrate 111. In more detail, the first conductive material 211 extending along the first direction D1 is provided between the insulation layer 116 at the bottom of the insulation material 112 adjacent to the substrate 111 and the substrate 111.

A first conductive material extending along the first direction D1 is provided between the insulation layer 116 at the top of the specific insulation material among the insulation materials 112 and the insulation layer 116 at the bottom of a specific insulation material among the insulation materials 112. For example, a plurality of first conductive materials 221 to 281 extending along the first direction D1 are provided between the insulation materials 112 and it may be understood that the insulation layer 116 is provided between the insulation materials 112 and the first conductive materials 221 to 281. The first conductive materials 211 to 291 may be formed of a conductive metal, but in other example embodiments of the inventive concepts the first conductive materials 211 to 291 may include or may be formed of a conductive material such as a polysilicon.

The same structures as those on the first and second doping regions 311 and 312 may be provided in a region between the second and third doping regions 312 and 313. In the region between the second and third doping regions 312 and 313, a plurality of insulation materials 112 are provided, which extend along the first direction D1. A plurality of pillars 113 is provided that are disposed sequentially along the first direction D1 and penetrate the plurality of insulation materials 112 along the third direction D3. An insulation layer 116 is provided on the exposed surfaces of the plurality of insulation materials 112 and the plurality of pillars 113, and a plurality of first conductive materials 211 to 291 extend along the first direction D1. Similarly, the same structures as those on the first and second doping regions 311 and 312 may be provided in a region between the third and fourth doping regions 313 and 314.

A plurality of drain regions 321 are provided on the plurality of pillars 113, respectively. The drain regions 321 may include or may be formed of silicon materials doped with a second type of charge carrier impurity. For example, the drain regions 321 may include or may be formed of silicon materials doped with an n-type dopant. In some example embodiments of the inventive concepts, the drain regions 321 include or are formed of n-type silicon materials. However, the drain regions 321 are not limited to n-type silicon materials.

On the drain regions, a plurality of second conductive materials 331, 332 and 333 are provided, which extend along the second direction D2. The second conductive materials 331 to 333 are disposed along the first direction D1, being spaced apart from each other by a specific distance. The second conductive materials 331 to 333 are respectively connected to the drain regions 321 in a corresponding region. The drain regions 321 and the second conductive material 333 extending along the second direction D2 may be connected through each contact plug. Each contact plug may be, for example, a conductive plug formed of a conductive material such as a metal. The second conductive materials 331 to 333 may include or may be formed of metal materials. The second conductive materials 331 to 333 may include or may be formed of conductive materials such as a polysilicon.

In the example of FIG. 19, the first conductive materials 211 to 291 may be used to form the wordlines WL, the string selection lines SSL and the ground selection lines GSL. For example, the first conductive materials 221 to 281 may be used to form the wordlines WL, where conductive materials belonging to the same layer may be interconnected. The second conductive materials 331 to 333 may be used to form the bitlines BL. The number of layers of the first conductive materials 211 to 291 may be changed variously according to process and control techniques.

Figure 20:
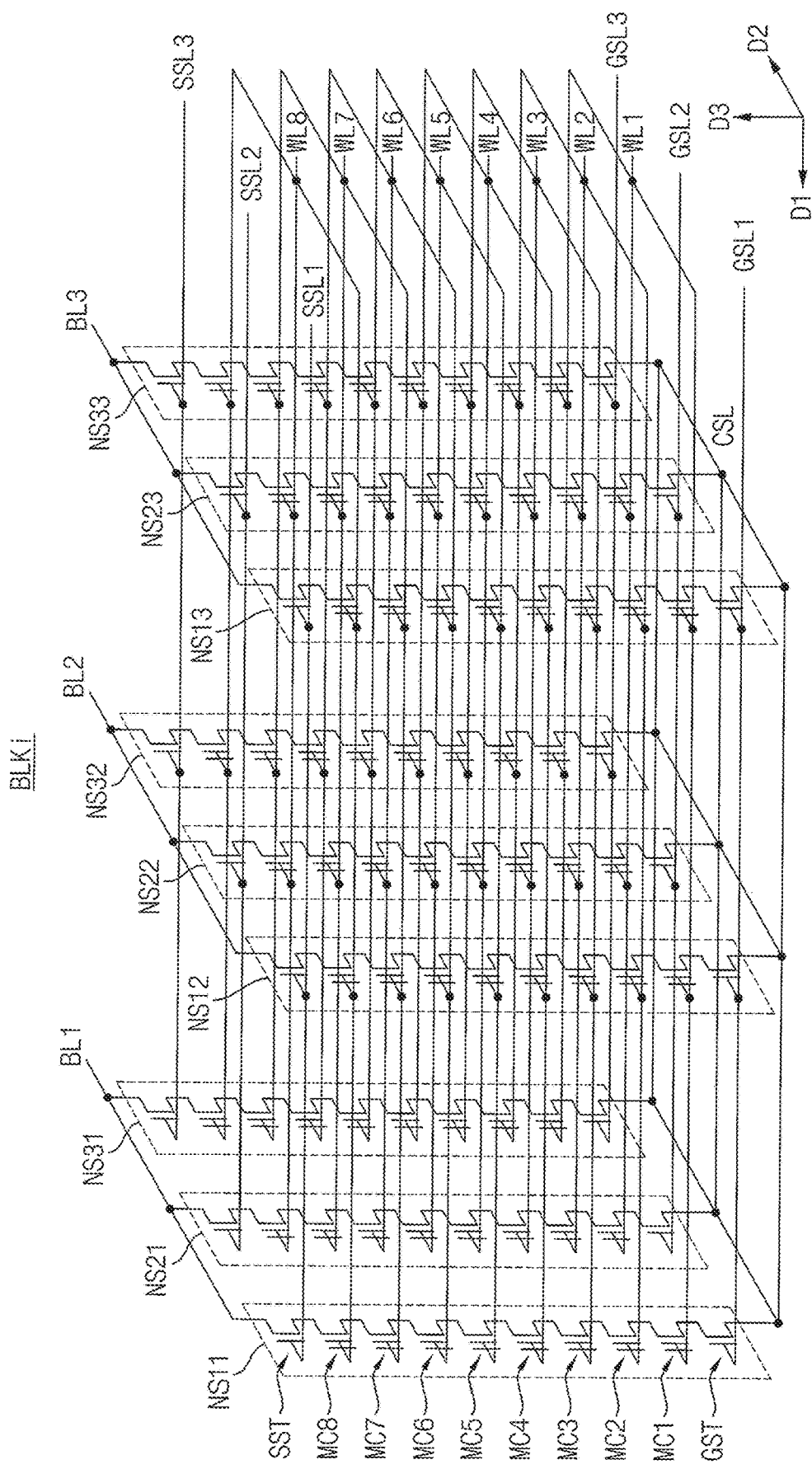
FIG. 20 is a circuit diagram illustrating an equivalent circuit of a memory block described with reference to FIG. 19.

FIG. 20 is a circuit diagram illustrating an equivalent circuit of a memory block described with reference to FIG. 19.

A memory block BLKi shown in FIG. 20 may refer to a 3D memory block having a 3D structure formed on a substrate. For example, a plurality of memory NAND strings included in the memory block BLKi may be formed in a vertical direction to the substrate.

Referring to FIG. 20, the memory block BLKi may include a plurality of memory NAND strings (e.g., NS11 to NS33), which are connected between bitlines BL1, BL2, and BL3 and a common source line CSL. Each of the memory NAND strings NS11 to NS33 may include a string selection transistor SST, a plurality of memory cells (e.g., MC1, MC2, . . . , and MC8), and a ground selection transistor GST. Each of the memory NAND strings NS11 to NS33 is illustrated as including eight memory cells MC1, MC2, . . . , and MC8 in FIG. 20, without being limited thereto.

The string selection transistor SST may be connected to string selection lines SSL1, SSL2, and SSL3 corresponding thereto. Each of the memory cells MC1, MC2, . . . , and MC8 may be connected to a corresponding one of gate lines GTL1, GTL2, . . . , and GTL8. The gate lines GTL1, GTL2, . . . , and GTL8 may respectively correspond to wordlines, and some of the gate lines GTL1, GTL2, . . . , and GTL8 may correspond to dummy wordlines. The ground selection transistor GST may be connected to ground selection lines GSL1, GSL2, and GSL3 corresponding thereto. The string selection transistor SST may be connected to the bitlines BL1, BL2, and BL3 corresponding thereto, and the ground selection transistor GST may be connected to the common source line CSL.

Wordlines (e.g., WL1) at the same level may be connected in common, and the ground selection lines GSL1, GSL2, and GSL3 and the string selection lines SSL1, SSL2, and SSL3 may be separated from each other. FIG. 20 illustrates a case in which a memory block BLKi is connected to eight gate lines GTL1, GTL2, . . . , and GTL8 and three bitlines BL1, BL2, and BL3, without being limited thereto.

The number of the wordlines WL1 to WL8, the number of the bitlines BL1 to BL3, and the number of memory cells MC1 to MC8 are limited to an example of FIG. 20.

Figure 21:
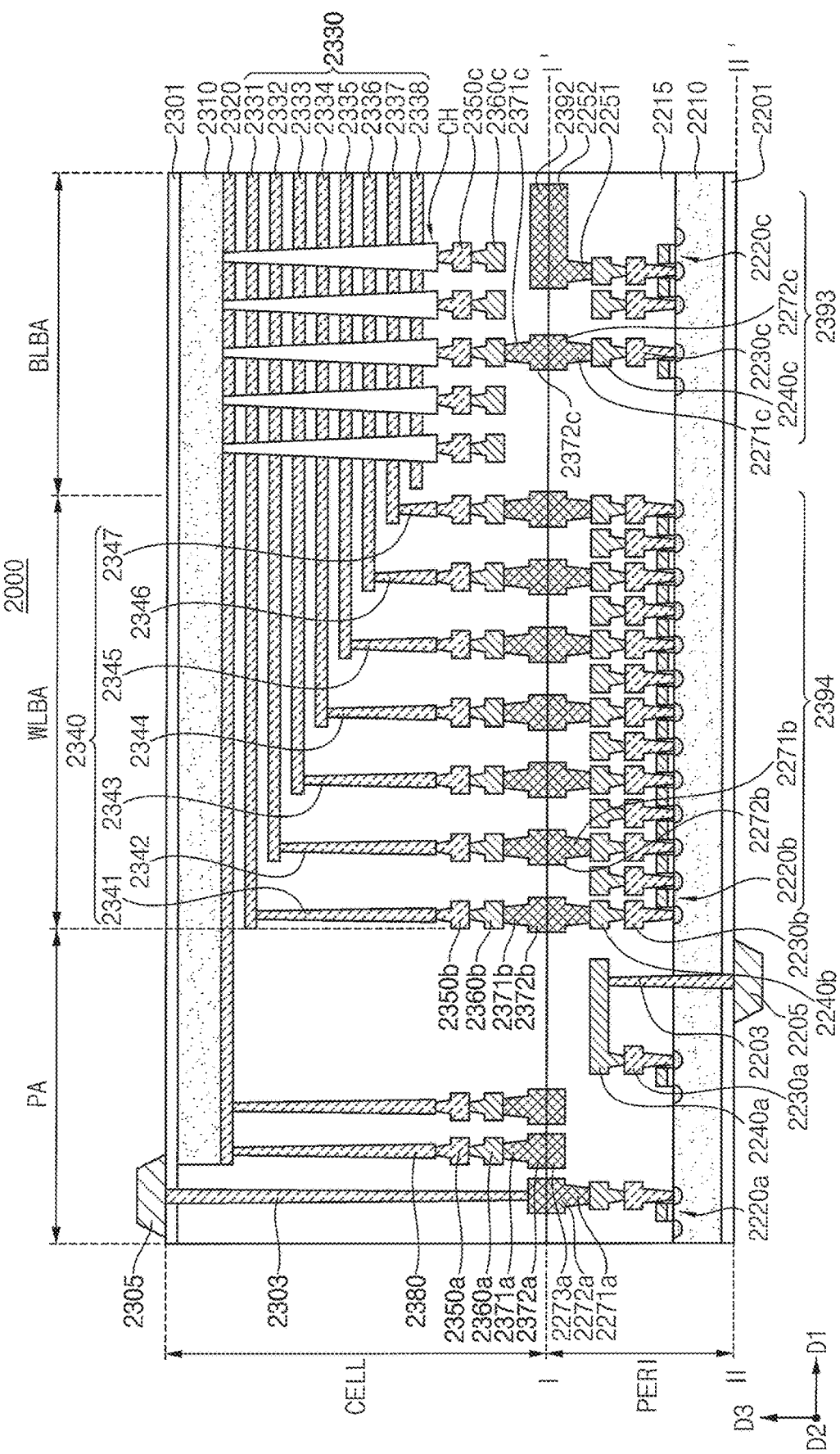
FIG. 21 is a cross-sectional view of a nonvolatile memory device included in a storage device according to example embodiments.

FIG. 21 is a cross-sectional view of a nonvolatile memory device included in a storage device according to example embodiments.

Referring to FIG. 21, a nonvolatile memory device 2000 may have a chip-to-chip (C2C) structure. The C2C structure may refer to a structure formed by manufacturing an upper chip including a memory cell region or a cell region CELL on a first wafer, manufacturing a lower chip including a peripheral circuit region PERI on a second wafer, separate from the first wafer, and then bonding the upper chip and the lower chip to each other. Here, the bonding process may include a method of electrically connecting a bonding metal formed on an uppermost metal layer of the upper chip and a bonding metal formed on an uppermost metal layer of the lower chip. For example, when the bonding metals may include copper (Cu) using a Cu-to-Cu bonding. The example embodiment, however, may not be limited thereto. For example, the bonding metals may also be formed of aluminum (Al) or tungsten (W).

Each of the peripheral circuit region PERI and the cell region CELL of the nonvolatile memory device 2000 may include an external pad bonding area PA, a wordline bonding area WLBA, and a bitline bonding area BLBA.

The peripheral circuit region PERI may include a first substrate 2210, an interlayer insulating layer 2215, a plurality of circuit elements 2220a, 2220b, and 2220c formed on the first substrate 2210, first metal layers 2230a, 2230b, and 2230c respectively connected to the plurality of circuit elements 2220a, 2220b, and 2220c, and second metal layers 2240a, 2240b, and 2240c formed on the first metal layers 2230a, 2230b, and 2230c. In some example embodiments, the first metal layers 2230a, 2230b, and 2230c may be formed of tungsten having relatively high electrical resistivity, and the second metal layers 2240a, 2240b, and 2240c may be formed of copper having relatively low electrical resistivity.

In example embodiments illustrated in FIG. 21, although only the first metal layers 2230a, 2230b, and 2230c and the second metal layers 2240a, 2240b, and 2240c are shown and described, the example embodiments are not limited thereto, and one or more additional metal layers may be further formed on the second metal layers 2240a, 2240b, and 2240c. At least a portion of the one or more additional metal layers formed on the second metal layers 2240a, 2240b, and 2240c may be formed of aluminum or the like having a lower electrical resistivity than those of copper forming the second metal layers 2240a, 2240b, and 2240c.

The interlayer insulating layer 2215 may be disposed on the first substrate 2210 and cover the plurality of circuit elements 2220a, 2220b, and 2220c, the first metal layers 2230a, 2230b, and 2230c, and the second metal layers 2240a, 2240b, and 2240c. The interlayer insulating layer 2215 may include an insulating material such as silicon oxide, silicon nitride, or the like.

Lower bonding metals 2271b and 2272b may be formed on the second metal layer 2240b in the wordline bonding area WLBA. In the wordline bonding area WLBA, the lower bonding metals 2271b and 2272b in the peripheral circuit region PERI may be electrically bonded to upper bonding metals 2371b and 2372b of the cell region CELL. The lower bonding metals 2271b and 2272b and the upper bonding metals 2371b and 2372b may be formed of aluminum, copper, tungsten, or the like. Further, the upper bonding metals 2371b and 2372b in the cell region CELL may be referred as first metal pads and the lower bonding metals 2271b and 2272b in the peripheral circuit region PERI may be referred as second metal pads.

The cell region CELL may include at least one memory block. The cell region CELL may include a second substrate 2310 and a common source line 2320. On the second substrate 2310, a plurality of wordlines 2331 to 2338 (e.g., 2330) may be stacked in a third direction D3 (e.g., a Z-axis direction), perpendicular to an upper surface of the second substrate 2310. At least one string selection line and at least one ground selection line may be arranged on and below the plurality of wordlines 2330, respectively, and the plurality of wordlines 2330 may be disposed between the at least one string selection line and the at least one ground selection line.

In the bitline bonding area BLBA, a channel structure CH may extend in the third direction D3 (e.g., the Z-axis direction), perpendicular to the upper surface of the second substrate 2310, and pass through the plurality of wordlines 2330, the at least one string selection line, and the at least one ground selection line. The channel structure CH may include a data storage layer, a channel layer, a buried insulating layer, and the like, and the channel layer may be electrically connected to a first metal layer 2350c and a second metal layer 2360c. For example, the first metal layer 2350c may be a bitline contact, and the second metal layer 2360c may be a bitline. In some example embodiments, the bitline 2360c may extend in a second direction D2 (e.g., a Y-axis direction), parallel to the upper surface of the second substrate 2310.

In example embodiments illustrated in FIG. 21, an area in which the channel structure CH, the bitline 2360c, and the like are disposed may be defined as the bitline bonding area BLBA. In the bitline bonding area BLBA, the bitline 2360c may be electrically connected to the circuit elements 2220c providing a page buffer 2393 in the peripheral circuit region PERI. The bitline 2360c may be connected to upper bonding metals 2371c and 2372c in the cell region CELL, and the upper bonding metals 2371c and 2372c may be connected to lower bonding metals 2271c and 2272c connected to the circuit elements 2220c of the page buffer 2393.

In the wordline bonding area WLBA, the plurality of wordlines 2330 may extend in a first direction D1 (e.g., an X-axis direction), parallel to the upper surface of the second substrate 2310 and perpendicular to the second direction D2, and may be connected to a plurality of cell contact plugs 2341 to 2347 (e.g., 2340). The plurality of wordlines 2330 and the plurality of cell contact plugs 2340 may be connected to each other in pads provided by at least a portion of the plurality of wordlines 2330 extending in different lengths in the first direction D1. A first metal layer 2350b and a second metal layer 2360b may be connected to an upper portion of the plurality of cell contact plugs 2340 connected to the plurality of wordlines 2330, sequentially. The plurality of cell contact plugs 2340 may be connected to the peripheral circuit region PERI by the upper bonding metals 2371b and 2372b of the cell region CELL and the lower bonding metals 2271b and 2272b of the peripheral circuit region PERI in the wordline bonding area WLBA.

The plurality of cell contact plugs 2340 may be electrically connected to the circuit elements 2220b forming a row decoder 2394 in the peripheral circuit region PERI. In some example embodiments, operating voltages of the circuit elements 2220b forming the row decoder 2394 may be different than operating voltages of the circuit elements 2220c forming the page buffer 2393. For example, operating voltages of the circuit elements 2220c forming the page buffer 2393 may be greater than operating voltages of the circuit elements 2220b forming the row decoder 2394.

A common source line contact plug 2380 may be disposed in the external pad bonding area PA. The common source line contact plug 2380 may be formed of a conductive material such as a metal, a metal compound, polysilicon, or the like, and may be electrically connected to the common source line 2320. A first metal layer 2350a and a second metal layer 2360a may be stacked on an upper portion of the common source line contact plug 2380, sequentially. For example, an area in which the common source line contact plug 2380, the first metal layer 2350a, and the second metal layer 2360a are disposed may be defined as the external pad bonding area PA.

Input/output pads 2205 and 2305 may be disposed in the external pad bonding area PA. A lower insulating film 2201 covering a lower surface of the first substrate 2210 may be formed below the first substrate 2210, and a first input/output pad 2205 may be formed on the lower insulating film 2201. The first input/output pad 2205 may be connected to at least one of the plurality of circuit elements 2220a, 2220b, and 2220c disposed in the peripheral circuit region PERI through a first input/output contact plug 2203, and may be separated from the first substrate 2210 by the lower insulating film 2201. In addition, a side insulating film may be disposed between the first input/output contact plug 2203 and the first substrate 2210 to electrically separate the first input/output contact plug 2203 and the first substrate 2210.

An upper insulating film 2301 covering the upper surface of the second substrate 2310 may be formed on the second substrate 2310, and a second input/output pad 2305 may be disposed on the upper insulating layer 2301. The second input/output pad 2305 may be connected to at least one of the plurality of circuit elements 2220a, 2220b, and 2220c disposed in the peripheral circuit region PERI through a second input/output contact plug 2303. In some example embodiments, the second input/output pad 2305 is electrically connected to a circuit element 2220a.

According to example embodiments, the second substrate 2310 and the common source line 2320 may not be disposed in an area in which the second input/output contact plug 2303 is disposed. Also, the second input/output pad 2305 may not overlap the wordlines 2330 in the third direction D3 (e.g., the Z-axis direction). The second input/output contact plug 2303 may be separated from the second substrate 2310 in the direction, parallel to the upper surface of the second substrate 2310, and may pass through the interlayer insulating layer 2315 of the cell region CELL to be connected to the second input/output pad 2305.

According to example embodiments, the first input/output pad 2205 and the second input/output pad 2305 may be selectively formed. For example, the nonvolatile memory device 2000 may include only the first input/output pad 2205 disposed on the first substrate 2210 or the second input/output pad 2305 disposed on the second substrate 2310. Alternatively, the nonvolatile memory device 2000 may include both the first input/output pad 2205 and the second input/output pad 2305.

A metal pattern provided on an uppermost metal layer may be provided as a dummy pattern or the uppermost metal layer may be absent, in each of the external pad bonding area PA and the bitline bonding area BLBA, respectively included in the cell region CELL and the peripheral circuit region PERI.

In the external pad bonding area PA, the nonvolatile memory device 2000 may include a lower metal pattern 2273a, corresponding to an upper metal pattern 2372a formed in an uppermost metal layer of the cell region CELL, and having the same cross-sectional shape as the upper metal pattern 2372a of the cell region CELL so as to be connected to each other, in an uppermost metal layer of the peripheral circuit region PERI. In the peripheral circuit region PERI, the lower metal pattern 2273a formed in the uppermost metal layer of the peripheral circuit region PERI may not be connected to a contact. Similarly, in the external pad bonding area PA, an upper metal pattern 2372a, corresponding to the lower metal pattern 2273a formed in an uppermost metal layer of the peripheral circuit region PERI, and having the same shape as a lower metal pattern 2273a of the peripheral circuit region PERI, may be formed in an uppermost metal layer of the cell region CELL.

The lower bonding metals 2271b and 2272b may be formed on the second metal layer 2240b in the wordline bonding area WLBA. In the wordline bonding area WLBA, the lower bonding metals 2271b and 2272b of the peripheral circuit region PERI may be electrically connected to the upper bonding metals 2371b and 2372b of the cell region CELL by a Cu-to-Cu bonding.

Further, in the bitline bonding area BLBA, an upper metal pattern 2392, corresponding to a lower metal pattern 2252 formed in the uppermost metal layer of the peripheral circuit region PERI, and having the same cross-sectional shape as the lower metal pattern 2252 of the peripheral circuit region PERI, may be formed in an uppermost metal layer of the cell region CELL. A contact may not be formed on the upper metal pattern 2392 formed in the uppermost metal layer of the cell region CELL.

In some example embodiments, corresponding to a metal pattern formed in an uppermost metal layer in one of the cell region CELL and the peripheral circuit region PERI, a reinforcement metal pattern having the same cross-sectional shape as the metal pattern may be formed in an uppermost metal layer in the other one of the cell region CELL and the peripheral circuit region PERI. A contact may not be formed on the reinforcement metal pattern.

Inventive concepts may be applied to various storage devices and computing systems including the storage devices. For example, inventive concepts may be applied to computing systems such as a PC, a server computer, a data center, a workstation, a mobile phone, a smart phone, a tablet computer, a laptop computer, a PDA, a PMP, a digital camera, a portable game console, a music player, a camcorder, a video player, a navigation device, a wearable device, an IoT device, an IoE device, an e-book reader, a VR device, an AR device, a robotic device, a drone, etc.

One or more of the elements disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The foregoing is illustrative of example embodiments and is not to be construed as limiting thereof. Although some example embodiments have been described, those skilled in the art will readily appreciate that many modifications are possible in embodiments of inventive concepts without materially departing from the novel teachings and advantages of embodiments of inventive concepts. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other embodiments of inventive concepts, are intended to be included within the scope of the appended claims.

What is claimed is:

1. A method of operating a storage device including a nonvolatile memory device, the method comprising:
    detecting an abnormal area as an optional area in the nonvolatile memory device, the abnormal area being a portion of the nonvolatile memory device where an access time exceeds a reference latency; and
    storing optional data in the optional area, wherein
    the storage device does not map a physical address of the optional area to a logical address, and
    the storage device does not provide an address of the optional area to a host.

2. The method of claim 1, wherein
    the reference latency is a reference write latency and a reference read latency, and
    the detecting the abnormal area as the optional area includes detecting a memory block of the nonvolatile memory device as the optional area if a time of a write operation for the memory block of the nonvolatile memory device exceeds the reference write latency or if a time of a read operation for the memory block exceeds the reference read latency.

3. The method of claim 1, wherein the detecting the abnormal area as the optional area includes:
    receiving a write request for a memory block within a normal area of the nonvolatile memory device from a host;
    performing a write operation for the memory block;
    transferring a write fail response to the host if the write operation is not completed within a reference write latency; and
    setting the memory block as the optional area if the write operation is not completed within the reference write latency.

4. The method of claim 1, wherein detecting the abnormal area as the optional area includes:
    receiving a read request for a memory block within a normal area of the nonvolatile memory device from a host;
    performing a read operation for the memory block;
    transferring a read fail response to the host if the read operation is not completed within a reference read latency; and
    setting the memory block as the optional area if the read operation is not completed within the reference read latency.

5. The method of claim 1, wherein, in response to a write request received from a host, the storage device selectively performs a write operation for a normal area of the nonvolatile memory device or a write operation for the optional area according to whether the write request includes meta data.

6. The method of claim 1, wherein the storing the optional data in the optional area includes:
    receiving a write request including write data and meta data, the meta data having a unique key for the write data;
    writing the write data as the optional data to the optional area in response to the write request; and storing the unique key for the write data and a physical address of the write data within the optional area in an optional area table for managing the optional data stored in the optional area.

7. The method of claim 1, wherein, in response to a read request received from a host, the storage device selectively performs a read operation for a normal area of the nonvolatile memory device or a read operation for the optional area according to whether the read request includes meta data.

8. The method of claim 1, further comprising:
receiving a read request from a host;
detecting whether the read request includes meta data; and
one of
reading read data from a normal area of the nonvolatile memory device based on a physical address to which a logical address included in the read request is mapped if the read request does not include the meta data; or
reading the optional data from the optional area based on a physical address in an optional area table if the read request includes the meta data.

9. The method of claim 1, wherein the optional data are data moved from a normal area of the nonvolatile memory device to the optional area, data deleted from the normal area, or backup data of data stored in the normal area.

10. The method of claim 1, wherein the storing the optional data in the optional area includes:
receiving a write request, the write request including a logical address for a memory block within a normal area of the nonvolatile memory device, write data, and meta data;
writing the write data to the memory block within the normal area based on a physical address to which the logical address is mapped; and
moving the optional data from the normal area to the optional area based on the meta data.

11. The method of claim 10, further comprising:
updating an optional data management table included in the storage device, wherein
the meta data includes a unique key, a version value, a store count, and policy information for the write data,
the storage device uses the optional data management table for managing the optional data written to the memory block within in the normal area, and
the updating the optional data management table is performed based on the meta data after the write data are written to the memory block within the normal area.

12. The method of claim 10, wherein the moving the optional data from the normal area to the optional area includes:
comparing a number of data having a unique key and different version values in an optional data management table with a store count of the meta data;
selecting one of the data having the different version values based on policy information of the meta data if the number of data is greater than the store count;
reading the one of the data from the normal area; and
writing the one of the data as the optional data to the optional area.

13. The method of claim 12, wherein the policy information includes one of a first value representing oldest data, a second value representing data having a lowest version value, a third value representing data having a largest size, and a fourth value representing data having a smallest size.

14. The method of claim 12, wherein
the storage device further includes an optional area table for managing the optional data stored in the optional area, and the moving the optional data from the normal area to the optional area further includes storing the unique key, a version value of the one of the data among the different version values, and a physical address of the one of the data within the optional area in the optional area table after the one of the data is written to the optional area.

15. The method of claim 1, further comprising:
receiving a read request from a host;
detecting whether the read request includes meta data;
performing a first-type read operation or performing an other operation according to the read request,
the first-type read operation being performed if the read request does not include the meta data, and
the performing the other operation being performed if the read request includes the meta data and the meta data has a unique key and a version value, wherein
the performing the first-type read operation includes reading first read data from a normal area of the nonvolatile memory device based on a first physical address to which a logical address included in the read request is mapped,
the performing the other operation includes searching the unique key and the version value in an optional data management table for managing the optional data stored in the normal area, and performing a second-type read operation if the unique key and the version value exist in the optional data management table or performing a third-type read operation if the unique key and the version value do not exist in the optional data management table,
the performing the second-type read operation includes reading second read data from the normal area based on a second physical address corresponding to the unique key and the version value in the optional data management table, and
the performing the third-type read operation includes searching the unique key and the version value in an optional area table for managing the optional data stored in the optional area and reading the optional data from the optional area based on a third physical address corresponding to the unique key and the version value in the optional area table.

16. The method of claim 1, further comprising:
setting the abnormal area as a permanent not working area of the nonvolatile memory device in response to the access time of the abnormal area exceeding a bad block reference latency,
wherein the bad block reference latency is longer than the reference latency.

17. A storage device comprising:
a nonvolatile memory device; and
a storage controller configured to control the nonvolatile memory device, wherein
the storage controller is configured to detect an abnormal area as an optional area in the nonvolatile memory device and to store optional data in the optional area, and
the abnormal area is a portion of the nonvolatile memory device where an access time exceeds a reference latency, wherein
the storage controller does not map a physical address of the optional area to a logical address, and
the storage controller does not provide an address of the optional area to a host.

18. A method of operating a storage device including a nonvolatile memory device, the method comprising:

detecting an abnormal area as an optional area in the nonvolatile memory device, the abnormal area being a portion of the nonvolatile memory device where an access time exceeds a reference latency;

receiving a write request including a logical address for a memory block within a normal area of the nonvolatile memory device, write data, and first meta data,
the first meta data including a first unique key, a first version value, a store count and policy information for the write data;

writing the write data to the memory block based on a physical address to which the logical address is mapped;

updating an optional data management table based on the first meta data;

comparing a number of data having the first unique key and different version values in the optional data management table with the store count of the first meta data;

selecting one of the data having the different version values based on the policy information of the first meta data if the number of data is greater than the store count;

reading the one of the data from the normal area;

writing the one of the data as optional data to the optional area; and storing the first unique key, a version value of the one of the data among the different version values, and a physical address of the one of the data within the optional area in an optional area table.

19. The method of claim 18, further comprising:

receiving a read request from a host;

detecting whether the read request includes second meta data;

performing a first-type read operation or performing an other operation according to the read request,
the first-type read operation being performed if the read request does not include the second meta data, and
the performing the other operation being performed if the read request includes the second meta data and the second meta data has a second unique key and a second version value, wherein the performing the first-type read operation includes reading first read data from the normal area based on a first physical address to which a logical address included in the read request is mapped, the performing the other operation includes searching the second unique key and the second version value in an optional data management table, and performing a second-type read operation if the second unique key and the second version value exist in the optional data management table or performing a third-type read operation if the second unique key and the second version value do not exist in the optional data management table, the performing the second-type read operation includes reading second read data from the normal area based on a second physical address corresponding to the second unique key and the second version value in the optional data management table, the performing the third-type read operation includes searching the second unique key and the second version value in the optional area table, and reading the optional data from the optional area based on a third physical address corresponding to the second unique key and the second version value in the optional area table.

* * * * *